US011336350B2

(12) United States Patent
Chen et al.

(10) Patent No.: US 11,336,350 B2
(45) Date of Patent: May 17, 2022

(54) FEEDBACK METHOD AND DEVICE FOR CHANNEL INFORMATION

(71) Applicant: ZTE CORPORATION, Shenzhen (CN)

(72) Inventors: Yijian Chen, Shenzhen (CN); Hao Wu, Shenzhen (CN); Zhaohua Lu, Shenzhen (CN); Nan Zhang, Shenzhen (CN); Yungok Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 289 days.

(21) Appl. No.: 16/338,426

(22) PCT Filed: Sep. 6, 2017

(86) PCT No.: PCT/CN2017/100686
§ 371 (c)(1),
(2) Date: Apr. 30, 2020

(87) PCT Pub. No.: WO2018/059200
PCT Pub. Date: Apr. 5, 2018

(65) Prior Publication Data
US 2020/0274597 A1   Aug. 27, 2020

(30) Foreign Application Priority Data

Sep. 30, 2016   (CN) ......................... 201610879341.X

(51) Int. Cl.
  *H04W 24/10*   (2009.01)
  *H04B 7/06*    (2006.01)
  *H04W 72/04*   (2009.01)
(52) U.S. Cl.
  CPC ......... *H04B 7/0626* (2013.01); *H04B 7/0639* (2013.01); *H04W 24/10* (2013.01); *H04W 72/04* (2013.01)

(58) Field of Classification Search
  CPC ... H04B 7/0626; H04B 7/0639; H04W 24/10; H04W 72/04
  (Continued)

(56) References Cited

U.S. PATENT DOCUMENTS

2015/0288505 A1   10/2015  Park et al.
2017/0294945 A1*  10/2017  Liu ..................... H04B 7/0626
  (Continued)

FOREIGN PATENT DOCUMENTS

CN   102377469 A    3/2012
CN   103428777 A   12/2013
  (Continued)

OTHER PUBLICATIONS

International Search Report for International Application No. PCT/CN2017/100686, dated Nov. 29, 2017, 2 pages.

*Primary Examiner* — Danh C Le
(74) *Attorney, Agent, or Firm* — Cantor Colburn LLP

(57) ABSTRACT

Provided in embodiments of the present invention are a method and device for feeding back channel information, the method comprising: determining a set of channel measurement resources, the set of channel measurement resources comprising M channel measurement resources, where M is a positive integer; performing channel measurement on the M channel measurement resources; selecting N channel measurement resources from M channel measurement resources according to the channel measurement result, where N is a positive integer, and N≤M; feeding back indication information of the selected N channel measurement resources. The embodiments of the present invention may solve the problem in the related art that a technology for selection of channel measurement resources is incapable of effectively corresponding to multiple paths, leading to low system robustness and transmission efficiency. Thus, when selecting channel measurement resources, it is possible to
  (Continued)

correspond to multiple paths, thus improving the system robustness and transmission efficiency.

14 Claims, 9 Drawing Sheets

(58) Field of Classification Search
USPC .............................. 370/329, 310.2; 455/450.1
See application file for complete search history.

(56) References Cited

U.S. PATENT DOCUMENTS

| | | | |
|---|---|---|---|
| 2018/0076940 A1* | 3/2018 | Zhou | H04L 5/0048 |
| 2018/0123659 A1* | 5/2018 | Qian | H04B 7/0626 |
| 2018/0248601 A1* | 8/2018 | Kishiyama | H04B 7/0636 |
| 2018/0335978 A1* | 11/2018 | Tidwell | G06F 3/0688 |
| 2019/0089437 A1* | 3/2019 | Chen | H04B 7/0617 |
| 2019/0190668 A1* | 6/2019 | Lei | H04W 74/085 |
| 2019/0393999 A1* | 12/2019 | Hasegawa | H04L 5/0007 |
| 2020/0028558 A1* | 1/2020 | Yerramalli | H04B 17/309 |
| 2020/0212987 A1* | 7/2020 | Priyanto | H04W 52/146 |
| 2021/0149039 A1* | 5/2021 | Koike-Akino | G01S 13/878 |

FOREIGN PATENT DOCUMENTS

| | | |
|---|---|---|
| CN | 103580819 A | 2/2014 |
| CN | 103716116 A | 4/2014 |
| CN | 104022856 A | 9/2014 |
| CN | 104038312 A | 9/2014 |
| CN | 104468030 A | 3/2015 |
| CN | 105812105 A | 7/2016 |
| WO | 2013133742 A1 | 9/2013 |

\* cited by examiner

FEEDBACK METHOD AND DEVICE FOR CHANNEL INFORMATION

TECHNICAL FIELD

The present invention relates to the field of communications, and in particular, to a method and device for feeding back channel information.

BACKGROUND

In a wireless communication system, in order to obtain a higher rate, generally multiple antennas are used in transmitting and a receiving ends for transmitting and receiving. One principle of multi-antenna technology is to use some characteristics of the channel to perform a precoding beamforming to form a transmission matching the channel characteristics, wherein a radiation direction of a signal is very targeted, which can effectively improve the performance of the system and significantly improve the performance without increasing bandwidth and power, so that it is widely used in current systems. The precoding beamforming technique is shown in FIG. 1, and the precoding is essentially the same technique as beamforming. The effect of precoding is to form a beam, and precoding may form a beam in the characteristic space or in the physical space. As shown in FIG. 1, the precoding/beamforming includes two parts: baseband precoding beamforming and radio frequency (RF) precoding beamforming. The baseband processing mainly acts on the RF path, and the RF processing mainly acts on the matrix of the RF channel. The former is completed on the baseband, and the latter is completed on the radio frequency. The precoding/beam mentioned in the present invention may be baseband or radio frequency, or a mixture thereof.

The premise for obtaining a large performance improvement in a multi-antenna system is that accurate channel state information (CSI) is required to accurately perform precoding beamforming; channel state information CSI is a relatively general concept as long as it is some information related to the channel, including a channel matrix, a rank indicator (RI) of a channel, a channel quality indication (CQI), a channel optimal precoding matrix vector (PMI), an optimal beam index (beam ID) or an optimal beamforming vector (beam weight), a multipath distribution information (angle domain, power domain, time domain, spatial domain) and other information which belong to a category of CSI.

In the related art, whether multiple PMIs or multiple beams are fed back, the general criterion is to use PMI or beam and a size of matching degree to select, for example, by traversing in the codebook and selecting codewords which are the most matched with the channel matrix H to correspond to PMI i, and then finding codewords which are the most matched with the channel matrix from the remaining codewords in the codebook to correspond to PMI j, wherein i is not equal to j because of restriction of algorithm selection. If more PMI need to be fed back, codewords which are the most matched with channel matrix are continuously found from the remaining codewords; when the beams are selected, the criterion thereof is also to select according to the quality of beams from the higher to the lower so as to select the best N beams; this selection technology may cause an obvious problem, and the reason of this problem is as follows:

Since selection of codewords or beams must ensure a good coverage, the design of a set of beams or codebook corresponding to FIG. 2 cannot meet the requirements and it can be seen from its envelope that there are obvious coverage holes. In FIG. 3, the design of a set of beams or codebook in which the oversampling factor is 2 is used to significantly reduce the coverage holes, wherein the larger the oversampling factor is, the better the coverage is, as shown in FIGS. 2 and 3. However, one the oversampling factor is used, components of the same path in the channel may have significant correlations with multiple beams, such as multipath in any direction in FIG. 3, at this moment, the path will enable the adjacent multiple beams or codewords to present good matching characteristics. When multiple beams or multiple PMIs are fed back, they may correspond to paths of the same channel; in fact, it is pursued to find multiple paths to improve robustness, or to combine so as to further improve the gain of precoding beamforming, and it is desirable to select beams or PMIs corresponding to multiple paths. Selecting beams or codewords in accordance with the criterion of the related art may not achieve the desired effect, resulting in the loss of performance. Since the oversampling factors are basically greater than or equal to 2, such a loss may substantially present. In order to pursue a larger multiple input multiple output (MIMO) gain, the CSI feedback accuracy requirement is also correspondingly improved, especially in channels with more multipath components, and single discrete Fourier transform (DFT) vector can only be aligned with the main direction and cannot obtain the maximum performance gain, and because of the single path, the robustness in some scenarios that paths are easy to be blocked is ordinary.

In view of the above technical problems, there has been no effective solution proposed in the related art.

SUMMARY

The embodiments of the present invention provides a method and device for feeding back channel information, in order to at least solve the problem that it is incapable of effectively corresponding to multiple paths during selection of a plurality of beams or a plurality of codewords when channel information is fed back so as to present inaccurate selection in the related art.

According to an embodiment of the present invention, there is provided a method for feeding back channel information comprising: determining a set of channel measurement resources, the set of channel measurement resources including M channel measurement resources, where M is a positive integer; performing a channel measurement on the M channel measurement resources; selecting the N channel measurement resources from the M channel measurement resources according to a result of the channel measurement, where N is a positive integer, and N≤M; and feeding back an indication information of the selected N channel measurement resources.

Optionally, selecting the N channel measurement resources from the M channel measurement resources according to the result of the channel measurement includes: selecting the N channel measurement resources from the M channel measurement resources according to the result of the channel measurement and a resource selection constraint.

Optionally, the method further includes: grouping the M channel measurement resources or the N channel measurement resources, and determining quality information of the channel measurement resources required to be fed back according to a manner of grouping.

Optionally, the M channel measurement resources include at least one of the following resources: a port resource; a beam resource; a sequence resource; a time domain resource; a frequency domain resource.

Optionally, the resource selection constraint includes: at least N' channel measurement resources respectively belonging to different channel measurement resource groups are included in the N channel measurement resources, the M channel measurement resources being divided into X channel measurement resource groups, where N' is an integer that is greater than or equal to 2 and less than N, and X is a positive integer.

Optionally, the X channel measurement resource groups are divided according to at least one of: a plurality of channel measurement resources corresponding to the same port being divided into one group; a plurality of channel measurement resources corresponding to the same sequence being divided into one group; a plurality of channel measurement resources included in the same time domain resource unit being divided into one group; a plurality of channel measurement resources included in the same frequency domain resource unit being divided into one group; a plurality of channel measurement resources included in the same resource block RB being divided into one group; determining the X channel measurement resource groups according to configuration signaling of a transmitting end.

Optionally, the resource selection constraint includes one of: the N channel measurement resources at least including $N_a$ channel measurement resources belonging to different time domain resource units, where $N_a$ is an integer that is greater than or equal to 2 and less than or equal to N, and the time domain resource unit including at least one of: a symbol, a symbol group, a time slot, a time slot group, a subframe, a subframe group, a transmission time interval TTI, a transmission time interval TTI group; the N channel measurement resources at least including $N_b$ channel measurement resources corresponding to different ports, where $N_b$ is an integer that is greater than or equal to 2 and less than or equal to N; the N channel measurement resources at least including $N_c$ channel measurement resources corresponding to different sequences, where $N_c$ is an integer that is greater than or equal to 2 and less than or equal to N; the N channel measurement resources at least including $N_d$ channel measurement resources corresponding to different resource blocks RB, where $N_d$ is an integer that is greater than or equal to 2 and less than or equal to N.

Optionally, the resource selection constraint includes one of: when the same time domain resource unit includes $M_a$ channel measurement resources of the M channel measurement resources, the N channel measurement resources at most including $n_a$ channel measurement resources of the $M_a$ channel measurement resources, where the $n_a$ is less than N; when the same port corresponds to $M_b$ channel measurement resources of the M channel measurement resources, the N channel measurement resources at most including $n_b$ channel measurement resources of the $M_b$ channel measurement resources, where the $n_b$ is less than N; when the same sequence corresponds to $M_c$ channel measurement resources of the M channel measurement resources, the N channel measurement resources at most including $n_c$ channel measurement resources of the $M_c$ channel measurement resources, where the $n_c$ is less than N; when the same RB includes $M_d$ channel measurement resources of the M channel measurement resources, the N channel measurement resources at most including $n_d$ channel measurement resources of the $M_d$ channel measurement resources, where the $n_d$ is less than N.

Optionally, the resource selection constraint includes one of: a relationship of the channel measurement resource indices corresponding to any two channel measurement resources of the N channel measurement resources satisfies an index relationship constraint rule, the index relationship constraint rule being configured by a transmitting end; an interval of locations of the time-frequency resources of the channel measurement resources corresponding to any two of the N channel measurement resources satisfies the time-frequency resource location interval constraint rule, the time-frequency resource location interval constraint rule being configured by a transmitting end.

Optionally, the resource selection constraint is determined by one of the following manners: determining according to a configuration instruction signaling of the transmitting end; and determining according to channel measurement resource configuration parameters transmitted by the transmitting end.

Optionally, the channel measurement resource configuration parameters include at least one of a number M of the M channel measurement resources; a configuration parameter for a subset included in the set of channel measurement resources; and resource location configuration parameters of the M channel measurement resources.

Optionally, the method further includes: receiving a weighted combined parameter or a phase difference indication parameter of N1 channel measurement resources in the N channel measurement resources transmitted by the transmitting end, where N1 is less than or equal to N.

According to another embodiment of the present invention, there is also provided a method for feeding back channel information, including: determining a channel quantization codebook, wherein the channel quantization codebook includes P codewords, where P is a positive integer; performing channel measurement on the P codewords; selecting the Q codewords from the P codewords according to a channel measurement result and codeword selection constraints, where Q is an integer that is greater than or equal to 2, and Q≤P; feeding back the indication information of the selected Q codewords.

Optionally, the codeword selection constraints include: the Q codewords at least including Q' codewords belonging to different codeword groups, in which the P codewords are divided into E codeword groups, where Q' is an integer that is greater than or equal to 2 and less than or equal to E, and E is a positive integer.

Optionally, division of the E codeword groups is determined by at least one of the following manners: determining according to a configuration parameter of the channel quantization codebook; determining according to a transmission mode; determining according to a feedback mode; determining according to a configuration parameter of a measurement pilot frequency; and determining the group of codewords according to a configuration instruction of the transmitting end.

Optionally, the configuration parameter of the channel quantization codebook includes at least one of: a codebook dimension configuration parameter, an oversampling factor configuration parameter, a vector spacing configuration parameter, and a codebook restriction configuration parameter.

Optionally, the configuration parameter of the measurement pilot frequency includes at least one of: a measurement pilot frequency type, a number of measurement pilot frequency ports, and a measurement pilot frequency pattern.

Optionally, the codeword selection constraints include at least one of: the Q codewords at least include $Q_a$ codewords which are not less than a threshold Y or distances of partial vectors included in the Q codewords are not less than the threshold Y; the Q codewords at least include $Q_b$ codewords which are not less than a threshold Z, or directional differences corresponding to partial vectors included in the Q codewords are not less than the threshold Z.

Optionally, the codeword selection constraints include: a relationship of codeword indices corresponding to any two codewords in the Q codewords satisfies an index relationship constraint rule.

Optionally, the codeword selection constraints are determined by: determining according to configuration instruction signaling transmitted by the transmitting end.

Optionally, the method further includes: receiving a weighted combined parameter or a phase difference indication parameter of P1 codewords of P codewords transmitted by the transmitting end, where P1 is less than or equal to P.

According to another embodiment of the present invention, there is also provided a method for feeding back channel information, including: determining channel information quantization definition indication information; configuring the channel information quantization definition indication information for a receiving end.

Optionally, the channel information quantization definition indication information includes at least one of: relationship definition indication information when selecting channel measurement resources; relationship definition indication information when selecting codewords.

Optionally, the relationship definition indication information when selecting channel measurement resources include at least one of: configuration information of a channel measurement resource group defined by selection of the channel measurement resources; information of the number of the most selected channel measurement resources in the channel measurement resource group; indication information defined by index relationship of the selected channel measurement resources; indication information defined by time frequency location relationship of the selected channel measurement resources.

Optionally, the relationship definition indication information when selecting codewords includes at least one of: division information of a codeword group defined by selection of codewords; configuration information of codewords which cannot be selected at the same time; indication information defined by a distance relationship of the codewords; indication information defined by a directional relationship of the codewords.

According to another embodiment of the present invention, there is also provided a device for feeding back channel information, including: a first determining module, configured for determining a set of channel measurement resources, the set of channel measurement resources including M channel measurement resources, where M is a positive integer; a first measuring module, configured for performing a channel measurement on the M channel measurement resources; a first selecting module, configured for selecting the N channel measurement resources from the M channel measurement resources according to a result of the channel measurement, where N is a positive integer, and N≤M; a first feeding back module, configured for feeding back indication information of the selected N channel measurement resources.

Optionally, the first selecting module includes: a first selecting unit, configured for selecting the N channel measurement resources from the M channel measurement resources according to the result of the channel measurement and a resource selection constraint.

Optionally, the device also includes: a grouping module, configured for grouping the M channel measurement resources or the N channel measurement resources, and determining quality information of the channel measurement resources required to be fed back according to a manner of grouping.

Optionally, the M channel measurement resources include at least one of the following resources: a port resource; a beam resource; a sequence resource; a time domain resource; a frequency domain resource.

Optionally, the resource selection constraint includes: at least N' channel measurement resources respectively belonging to different channel measurement resource groups are included in the N channel measurement resources, the M channel measurement resources being divided into X channel measurement resource groups, where N' is an integer that is greater than or equal to 2 and less than N, and X is a positive integer.

Optionally, the X channel measurement resource groups are divided according to at least one of: a plurality of channel measurement resources corresponding to the same port being divided into one group; a plurality of channel measurement resources corresponding to the same sequence being divided into one group; a plurality of channel measurement resources included in the same time domain resource unit being divided into one group; a plurality of channel measurement resources included in the same frequency domain resource unit being divided into one group; a plurality of channel measurement resources included in the same resource block RB being divided into one group; determining the X channel measurement resource groups according to configuration signaling of a transmitting end.

Optionally, the resource selection constraint includes one of: the N channel measurement resources at least including $N_a$ channel measurement resources belonging to different time domain resource units, where $N_a$ is an integer that is greater than or equal to 2 and less than or equal to N, and the time domain resource unit including at least one of: a symbol, a symbol group, a time slot, a time slot group, a subframe, a subframe group, a transmission time interval TTI, a transmission time interval TTI group; the N channel measurement resources at least including $N_b$ channel measurement resources corresponding to different ports, where $N_b$ is an integer that is greater than or equal to 2 and less than or equal to N; the N channel measurement resources at least including channel measurement resources corresponding to different sequences, where $N_c$ is an integer that is greater than or equal to 2 and less than or equal to N; the N channel measurement resources at least including $N_d$ channel measurement resources corresponding to different resource blocks RB, where $N_d$ is an integer that is greater than or equal to 2 and less than or equal to N.

Optionally, the resource selection constraint includes one of: when the same time domain resource unit includes $M_a$ channel measurement resources of the M channel measurement resources, the N channel measurement resources at most including $n_a$ channel measurement resources of the $M_a$ channel measurement resources, where the $n_a$ is less than N; when the same port corresponds to $M_b$ channel measurement resources of the M channel measurement resources, the N channel measurement resources at most including $n_b$ channel measurement resources of the $M_b$ channel measurement resources, where the $n_b$ is less than N; when the same sequence corresponds to $M_c$ channel measurement resources of the M channel measurement resources, the N channel measurement resources at most including $n_c$ channel measurement resources of the $M_c$ channel measurement resources, where the $n_c$ is less than N; when the same RB includes $M_d$ channel measurement resources of the M channel measurement resources, the N channel measurement resources at most including $n_d$ channel measurement resources of the $M_d$ channel measurement resources, where the $n_d$ is less than N.

Optionally, the resource selection constraint includes one of: a relationship of the channel measurement resource indices corresponding to any two channel measurement resources of the N channel measurement resources satisfies an index relationship constraint rule, the index relationship constraint rule being configured by a transmitting end; an interval of locations of the time-frequency resources of the channel measurement resources corresponding to any two of the N channel measurement resources satisfies the time-frequency resource location interval constraint rule, the time-frequency resource location interval constraint rule being configured by a transmitting end.

Optionally, the resource selection constraint is determined by one of the following manners: determining according to configuration instruction signaling of the transmitting end; determining according to channel measurement resource configuration parameters transmitted by the transmitting end.

According to another embodiment of the present invention, there is also provided a device for feeding back channel information, including: a second determining module, configured for determining a channel quantization codebook, the channel quantization codebook including P codewords, where P is a positive integer; a second measuring module, configured for performing channel measurement on the P codewords; a second selecting module, configured for selecting the Q codewords from the P codewords according to a channel measurement result and codeword selection constraints, where Q is an integer that is greater than or equal to 2, and Q≤P; a second feeding back module, configured for feeding back the indication information of the selected Q codewords.

Optionally, the codeword selection constraints include: the Q codewords at least including Q' codewords belonging to different codeword groups, in which the P codewords are divided into E codeword groups, where Q' is an integer that is greater than or equal to 2 and less than or equal to E, and E is a positive integer.

Optionally, division of the E codeword groups is determined by at least one of the following manners: determining according to a configuration parameter of the channel quantization codebook; determining according to a transmission mode; determining according to a feedback mode; determining according to a configuration parameter of a measurement pilot frequency; determining the group of codewords according to a configuration instruction of the transmitting end.

Optionally, the codeword selection constraints include at least one of: the Q codewords at least include $Q_a$ codewords which are not less than a threshold Y or distances of partial vectors included in the Q codewords are not less than the threshold Y; the Q codewords at least include $Q_b$ codewords which are not less than a threshold Z, or directional differences corresponding to partial vectors included in the Q codewords are not less than the threshold Z.

Optionally, the codeword selection constraints include: a relationship of codeword indices corresponding to any two codewords in the Q codewords satisfies an index relationship constraint rule.

Optionally, the codeword selection constraints are determined by: determining according to configuration instruction signaling transmitted by the transmitting end.

According to another embodiment of the present invention, there is also provided a device for feeding back channel information, including: a third determining module, configured for determining channel information quantization definition indication information; a configuring module, configured for configuring the channel information quantization definition indication information for a receiving end.

Optionally, the channel information quantization definition indication information includes at least one of: a relationship definition indication information when selecting channel measurement resources; and a relationship definition indication information when selecting codewords.

According to still another embodiment of the present invention, there is also provided a storage medium. The storage medium is configured for storing procedure codes to carry out the above steps.

With embodiments of the present invention, the terminal performs channel measurement on M channel measurement resources in the set of channel measurement resources, and selects N channel measurement resources from M channel measurement resources, and then the terminal feeds back the indication information of N channel measurement resources to the base station. Therefore, the embodiments of the present invention may solve the problem in the related art that a technology for selection of channel measurement resources is incapable of effectively corresponding to multiple paths, leading to low system robustness and transmission efficiency. Thus, when selecting channel measurement resources, it is possible to correspond to multiple paths, thus improving the system robustness and transmission efficiency.

BRIEF DESCRIPTION OF THE DRAWINGS

The drawings described herein are intended to provide a further understanding of the present invention, and constitute part of the present invention. The exemplary embodiments of the present invention and description thereof are intended to illustrate the present invention, and do not constitute an improper limitation of the present invention. In the drawings.

DETAILED DESCRIPTION

The present invention will be described in detail below with reference to the drawings in conjunction with the embodiments. It should be noted that the embodiments in the present application and the features in the embodiments may be combined with each other without conflict.

It should be understood that the terms "first," "second" or the like in the specification and claims of the present invention are used to distinguish similar objects, and are not necessarily used to describe a particular order (sequence) or precedence order.

Figure 1:
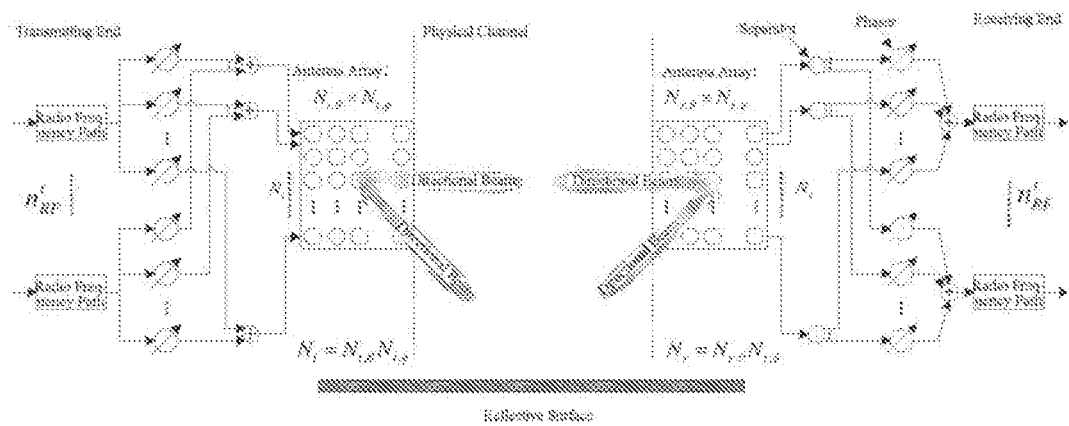
FIG. 1 is a schematic view of a precoding beamforming technique in the related art.
Figure 2:
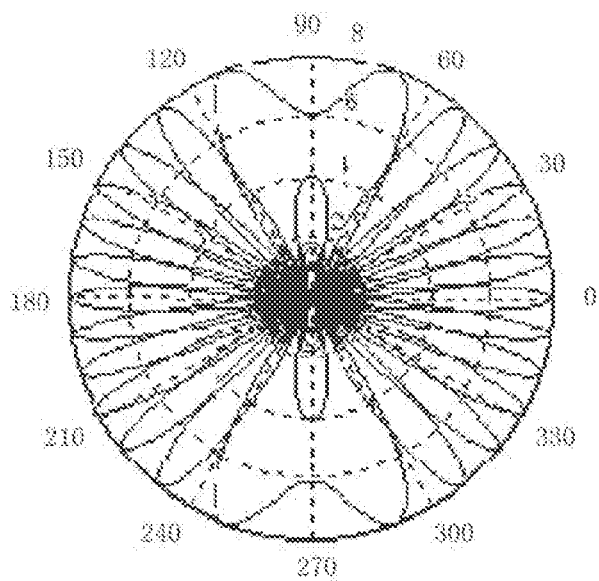
FIG. 2 is a first schematic view of coverage of codewords/beams in the related art.
Figure 3:
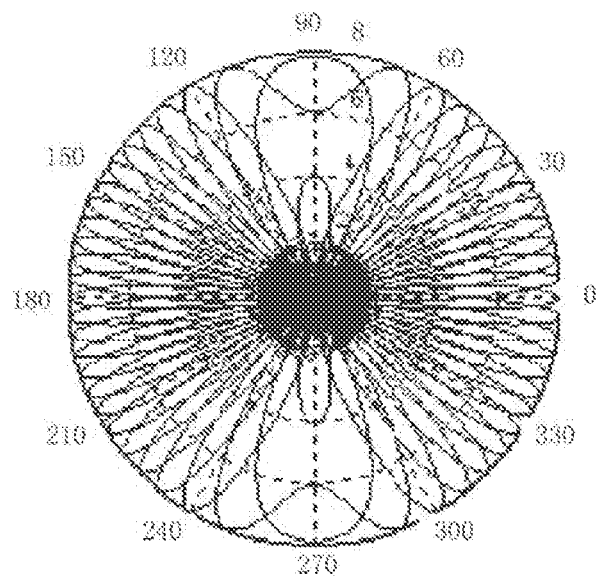
FIG. 3 is a second schematic view of coverage of codewords/beams in the related art.
Figure 4:
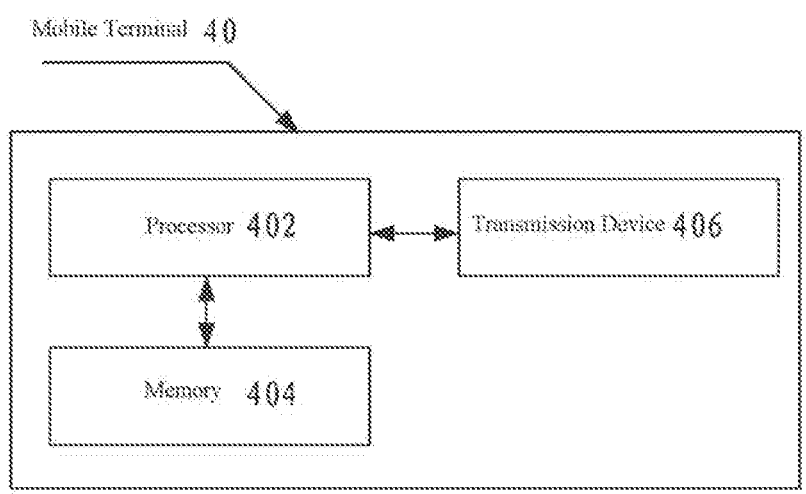
FIG. 4 is a structural block diagram of a hardware of a mobile terminal using a new method for information feedback according to an embodiment of the present invention.

The method embodiment provided in a first embodiment of the present application can be executed in a mobile terminal, a computer terminal or the like. Taking a mobile terminal as an example, FIG. 4 is a structural block diagram of a hardware of a mobile terminal using a new method for information feedback according to an embodiment of the present invention. As shown in FIG. 4, the mobile terminal 40 may include one or more (only one is shown in FIG. 4) processors 402 (the processor 402 may include, but is not limited to, a processing device such as a microprocessor MCU or a programmable logic device FPGA), a memory 404 configured to store data, and a transmission device 406 configured to have a communication function. It will be understood by those skilled in the art that the structure shown in FIG. 4 is merely illustrative and does not limit the structure of the above electronic device. For example, the mobile terminal 40 may also include more or less components than those shown in FIG. 4, or have a different configuration from that shown in FIG. 4.

The memory 404 may be configured as a software program and a module for storing application software, such as a program instruction/module corresponding to the method of feeding back channel information in the embodiment of the present invention, and the processor 402 runs the software program and the module stored in the memory 404, thereby performing various functional applications and data processing, i.e., implementing the above method. The memory 404 may include a high speed random access memory, and may also include a non-volatile memory, such as one or more magnetic storage devices, flash memories, or other non-volatile solid state memories. In some examples, the memory 404 may further include a memory remotely disposed relative to the processor 402, and these remote memories may be connected to the mobile terminal 40 via networks. Examples of such networks include, but are not limited to, Internet, intranets, local area networks, mobile communication networks, and combinations thereof.

The transmission device 406 is configured to receive or transmit data via a network. The specific example of the above-described network may include a wireless network provided by a communication provider of the mobile terminal 40. In one example, the transmission device 406 includes a Network Interface Controller (NIC) that may be connected to other network devices via a base station to communicate with the Internet. In one example, the transmission device 406 may be a Radio Frequency (RF) module configured to wirelessly communicate with the Internet.

There are two main manners to feed back the precoding/beam information: a codebook based feedback and a beam selection based feedback.

The first feedback manner: the feedback of the PMI based on the codebook is more commonly used for precoding information feedback of the baseband portion. Preferably, the precoding indication information uses the codebook based feedback, the basic principle of which is to select a suitable codeword from the codebook to represent the best precoding information; the basic principle of the channel information quantification feedback based on the codebook is as follows: assuming that the limited feedback channel capacity is B bps/Hz, the number of available codewords is $N=2^B$. The characteristic vector space of the channel matrix is quantized to form a codebook space $\Re = \{F_1, F_2 \ldots F_N\}$. The transmitting end and the receiving end jointly save generate the codebook in real time (which are the same at the transmitting end and the receiving end). According to the channel matrix H obtained by the receiving end, the receiving end selects a codeword $\hat{F}$ which is the best matched with the channel from $\Re$ according to a certain criterion, and feeds the serial number i of the codeword (i.e., PMI) back to the transmitting end. The transmitting end finds the corresponding precoding codeword $\hat{F}$ according to this serial number i, thereby obtaining the channel information, wherein $\hat{F}$ represents the characteristic vector information of the channel. In the LTE-A system, the codebook generally uses a dual-polarized GoB codebook, and a DFT vector is used to perform precoding in each polarization direction. This codebook may select a best codeword to enable the precoding to correspond to the main path (the strongest path) of the channel, so as to obtain the precoding gain. The main principle of feeding back a plurality of precoder components is to feed back a plurality of first-type precoder components, or to feed back a plurality of first-type precoder components and weighted combined information; the base station may use the precoder component to perform precoding, and may also generate final precoder for precoding by combining precoder components in a weighted combined manner, which improves transmission performance.

The second feedback manner: beam training and feedback are performed in the following manner, and a suitable beam is selected for transmission. The feedback of beam information is generally used for RF precoding or RF baseband hybrid precoding.

Step A: configuring a transmission parameter of the channel measurement beam pilot frequency to the receiving end;

Step B: the transmitting end transmitting M beam pilot frequencies for channel measurement;

Step C: the receiving end receiving the configuration parameter for measuring beam pilot frequencies to receive these measurement beam pilot frequencies; and performing a measurement by using the M beam pilot frequencies, so as to obtain channel quality information;

Step D: the receiving end selecting N beam pilot frequencies (the general criterion is to select one with the best quality), and feeding back the corresponding beam index and quality information;

In this manner, a common value of N may be 1, or may also be greater than 1. When N is greater than 1, it is equivalent to feeding back information of a plurality of beams, and the plurality of beams are generally used to represent a plurality of transmission paths. Similar to the first manner, the plurality of beams may be selected for transmission, or a weighted combined weight feedback may be added, and the transmitting end combines the beams for transmission;

It should be pointed out that the feedback of the beam information may also be equivalent to the feedback of other resource information, since the beam may have a binding relationship with some resources. For example, M beams may be bound to M ports, so that it is equivalent to select beams and select ports; or M beams may be bound to different time domain resources of the same port, so that selecting different time domains of this port means that different beams are selected; or M beams may be bound to different frequency domain resources of the same port, so that selecting different frequency domain resources of this port means that different beams are selected; or M beams may be bound to different sequence resources, so that selecting different sequences means that different beams are selected; other combinations of some equivalent manners, some of the above manners may be used. In general, the beam is implicitly bound to a resource of a certain dimension, and feeding back location or index information of these resources indicates selection information of the beam. If the resource selection for a certain dimension is used for CSI measurement feedback, it may also be considered equivalent to the beam selection herein.

Figure 5:
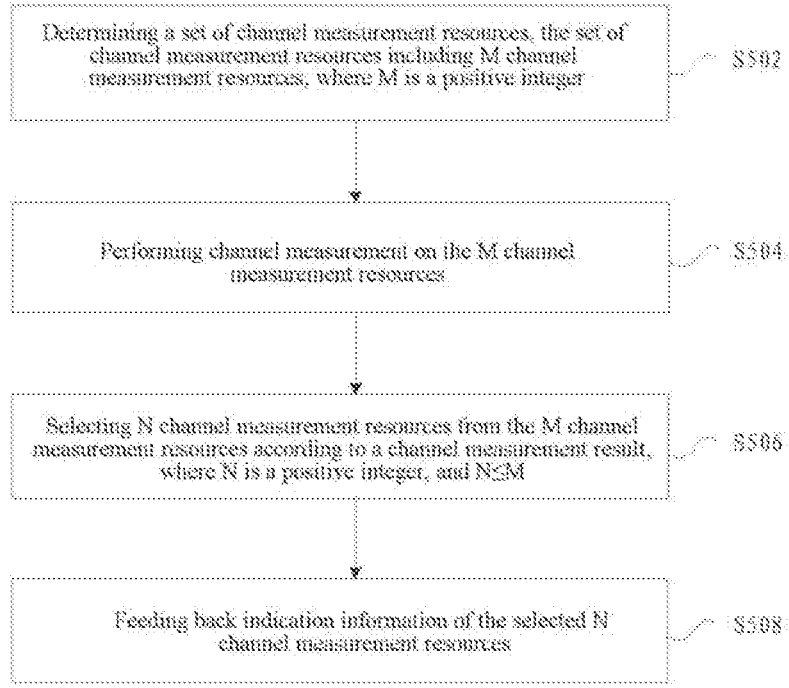
FIG. 5 is a first flowchart of a method for feeding back channel information according to an embodiment of the present invention.

In this embodiment, a method for feeding back channel information running on the mobile terminal is provided. FIG. 5 is a first flowchart of a method for feeding back channel information according to an embodiment of the present invention. As shown in FIG. 5, the flow includes the following steps:

Step S502: determining a set of channel measurement resources, the set of channel measurement resources including M channel measurement resources, where M is a positive integer;

Step S504: performing a channel measurement on the M channel measurement resources;

Step S506: selecting N channel measurement resources from the M channel measurement resources according to a result of the channel measurement, where N is a positive integer, and $N \leq M$;

Step S508: feeding back an indication information of the selected N channel measurement resources.

With the above-mentioned steps, the terminal performs channel measurement on M channel measurement resources in the set of channel measurement resources, and selects N channel measurement resources from M channel measurement resources, and then the terminal feeds back the indication information of N channel measurement resources to the base station. Therefore, the embodiments of the present invention may solve the problem in the related art that a technology for selection of channel measurement resources is incapable of effectively corresponding to multiple paths, leading to low system robustness and transmission efficiency. Thus, when selecting channel measurement resources, it is possible to correspond to multiple paths, thus improving the system robustness and transmission efficiency.

Optionally, an executive body of the foregoing steps may be a terminal, but is not limited thereto.

In an optical embodiment, selecting N channel measurement resources from the M channel measurement resources according to the result of the channel measurement includes: selecting the N channel measurement resources from the M channel measurement resources according to the result of the channel measurement and a resource selection constraint.

In an optical embodiment, the method may further include: grouping the M channel measurement resources or the N channel measurement resources, and determining quality information of the channel measurement resources required to be fed back according to a manner of grouping. In this embodiment, the base station transmits configuration signaling to divide M channel measurement resources into X groups, wherein each group respectively includes one or more resources, and the terminal feeds back the channel measurement resource quality information according to the grouping manner. For example, the terminal selects one or more channel measurement resource groups, and feeds back channel quality information corresponding to the best one or more channel resources in the channel resource group; for another example, the terminal selects one or more channel measurement resource groups, and feeds back the average quality information of channel measurement resources included in the channel resource group; in addition to grouping of the base station, the terminal is grouped according to the measurement result, for example, resources with similar quality information are grouped into one group, and measurement resources having the same receiving beam are grouped into one group. In a similar manner, the terminal selects one or more channel measurement resource groups, and feeds back the channel quality information corresponding to the best one or more channel resources in the channel resource group, or the terminal selects one or more channel measurement resource groups, and feeds back the average quality information of channel measurement resources included in the channel resource group.

In an optical embodiment, determining the set of channel measurement resources include: determining the set of channel measurement resources according to configuration of the transmitting end. In this embodiment, the transmitting end may be a base station, and the set of channel measurement resources may be configured by the base station.

In an optical embodiment, the M channel measurement resources include at least one of the following resources: a port resource; a beam resource; a sequence resource; a time domain resource; a frequency domain resource. In this embodiment, a code domain resource may also be included. The preferred combination types may be: a combination of the time domain resource and the frequency domain resource, the time domain resource and the code domain resource, the port resource and the time domain resource, the port resource and the frequency domain resource, and may also be a combination of resource types of more dimensions (for example, the time domain resource, and the frequency domain resource, and the port resource). The beam resource may be bound to the channel measurement resources, for example, channel measurement resources 1-16 may correspond to beams IDs 1-16, or channel measurement resources 1-32 may correspond to beam IDs 1-32, so that it is equivalent to select the beam ID or to select the channel measurement resource, and feed back the channel measurement resource ID. In this embodiment, a relationship between the beam ID and the channel measurement resource ID may be only a distance, or the channel measurement resource ID may be a function of the beam ID, and the relationship between the beam ID and the channel measurement resource may not be necessarily a one-to-one corresponding relationship. The M channel measurement resources are generally configured by the transmitting end, i.e., configured by the base station. The receiving end (terminal) determines M channel measurement resources according to the measurement configuration indication information of the transmitting end, wherein the M channel measurement resources may be resources corresponding to the same cell (or sector), or may be resources corresponding to different cells (or sectors); on the M channel measurement resources, it may be the same node TP to send a signal, or may be different nodes IP to send signals; on the M channel measurement resources, it may be the same transmit antenna or antenna group to send a signal, or may be different antennas or antenna groups to send signals, so that the diversity and flexibility of channel measurement resources are increased, making communication between the terminal and the base station more accurate.

In an optical embodiment, performing channel measurement on the M channel measurement resources include one of: when the transmission powers on the M channel measurement resources are the same, the channel measurement is performed on the M channel measurement resources by measuring received powers on the M channel measurement resources; when the transmission powers on the M channel measurement resources are different, channel measurement is performed on the M channel measurement resources by calculating the channel gain according to the radio of the transmission power to the received power on the M channel measurement resources. In this embodiment, the greater the received power is, the better the channel condition is, and the more accurate the used beam is. The calculating manner of the channel gain is to use the ratio of the received power to the transmission power, and the calculation of the channel gain is more accurate since the ratio is a relatively constant value.

In an optical embodiment, selecting N channel measurement resources from the M channel measurement resources according to the result of the channel measurement includes: determining a value of the N configured by the transmitting end, where N is an integer greater than or equal to 2; and selecting the N channel measurement resources from the M channel measurement resources according to the result of the channel measurement. In this embodiment, the transmitting end may configure the value of N, wherein when N is greater than or equal to 2, the diversity gain of the multipath transmission may be obtained, and the better performance of the measurement channel may be obtained. The combined gain obtained by combining after multipath transmission has a better performance than that of a single path transmission. When the combined gain is needed, the receiving end selects N channel measurement resources, measures N channel measurement resources, and feeds back phase difference information between some or all of the channel measurement resources in the measurement result. It may also be called weighted combined information.

In an optical embodiment, selecting the N channel measurement resources from the M channel measurement resources according to the result of the channel measurement includes: selecting the N channel measurement resources from the M channel measurement resources according to the result of the channel measurement and the resource selection constraint. In this embodiment, selection condition of the channel measurement resources is restricted, which ensures the accuracy of selection of the channel measurement resources.

In an optical embodiment, the resource selection constraint includes: at least N' channel measurement resources respectively belonging to different channel measurement resource groups are included in the N channel measurement resources, the M channel measurement resources being divided into X channel measurement resource groups, where N' is an integer that is greater than or equal to 2 and less than N, and X is a positive integer. In this embodiment, dividing M channel measurement resources into X channel resource groups may classify different types of channel measurement resources, so that the terminal may select beams in a targeted manner.

In an optical embodiment, the X channel measurement resource groups are divided according to at least one of: a plurality of channel measurement resources corresponding to the same port being divided into one group; a plurality of channel measurement resources corresponding to the same sequence being divided into one group; a plurality of channel measurement resources included in the same time domain resource unit being divided into one group; a plurality of channel measurement resources included in the same frequency domain resource unit being divided into one group; a plurality of channel measurement resources included in the same resource block RB being divided into one group; determining the X channel measurement resource groups according to configuration signaling of the transmitting end. In this embodiment, a plurality of resources included in the same time domain resource unit are divided into one group, for example, the domain resource may be: a symbol or a symbol group, a time slot or a time slot group, a subframe or a subframe group, a TTI or a TTI group. The plurality of channel measurement resources included in the same resource block RB may be divided into one group and the plurality of channel measurement resources corresponding to the same sequence may be divided into one group by the above-mentioned division manners, or a combination of the above-mentioned manners.

In an optical embodiment, the resource selection constraint includes one of: the N channel measurement resources at least include $N_a$ channel measurement resources belonging to different time domain resource units, where $N_a$ is an integer that is greater than or equal to 2 and less than or equal to N, and the time domain resource unit includes at least one of: a symbol, a symbol group, a time slot, a time slot group, a subframe, a subframe group, a transmission time interval TTI, a transmission time interval TTI group; the N channel measurement resources at least include $N_b$ channel measurement resources corresponding to different ports, where $N_b$ is an integer that is greater than or equal to 2 and less than or equal to N; the N channel measurement resources at least include $N_c$ channel measurement resources corresponding to different sequences, where $N_c$ is an integer that is greater than or equal to 2 and less than or equal to N; the N channel measurement resources at least include $N_d$ channel measurement resources corresponding to different resource blocks RB, where $N_d$ is an integer that is greater than or equal to 2 and less than or equal to N.

In an optical embodiment, the resource selection constraint includes one of: when the same time domain resource unit includes $M_a$ channel measurement resources of the M channel measurement resources, the N channel measurement resources at most including $n_a$ channel measurement resources of the $M_a$ channel measurement resources, where $n_a$ is less than N; when the same port corresponds to $M_b$ channel measurement resources of the M channel measurement resources, the N channel measurement resources at most including $n_b$ channel measurement resources of the $M_b$ channel measurement resources, where $n_b$ is less than N; when the same sequence corresponds to $M_c$ channel measurement resources of the M channel measurement resources, the N channel measurement resources at most including $n_c$ channel measurement resources of the $M_c$ channel measurement resources, where $n_c$ is less than N; when the same RB includes $M_d$ channel measurement resources of the M channel measurement resources, the N channel measurement resources at most including $n_d$ channel measurement resources of the $M_d$ channel measurement resources, where $n_d$ is less than N.

In an optical embodiment, the resource selection constraint includes one of: a relationship of the channel measurement resource indices corresponding to any two channel measurement resources of the N channel measurement resources satisfies an index relationship constraint rule, the index relationship constraint rule being configured by a transmitting end; an interval of locations of the time-frequency resources of the channel measurement resources corresponding to any two of the N channel measurement resources satisfies the time-frequency resource location interval constraint rule, the time-frequency resource location interval constraint rule being configured by a transmitting end.

In an optical embodiment, the resource selection constraint is determined by one of the following manners: determining according to configuration instruction signaling of the transmitting end; determining according to channel measurement resource configuration parameters transmitted by the transmitting end.

In an optical embodiment, the channel measurement resource configuration parameters include at least one of: the number M of the M channel measurement resources; a configuration parameter for the subset included in the set of channel measurement resources; resource location configuration parameters of the M channel measurement resources.

In an optical embodiment, the method further includes: receiving a weighted combined parameter or a phase difference indication parameter of N1 channel measurement resources in the N channel measurement resources transmitted by the transmitting end, where N1 is less than or equal to N. In this embodiment, the base station also feeds back a weighted combined parameter or a phase difference indication parameter of N1 channel measurement resources in the N channel measurement resources.

In an optical embodiment, feeding back the indication information of the selected N channel measurement resources include: feeding back indication information of the N channel measurement resources on the uplink data channel or the uplink control channel.

Figure 6:
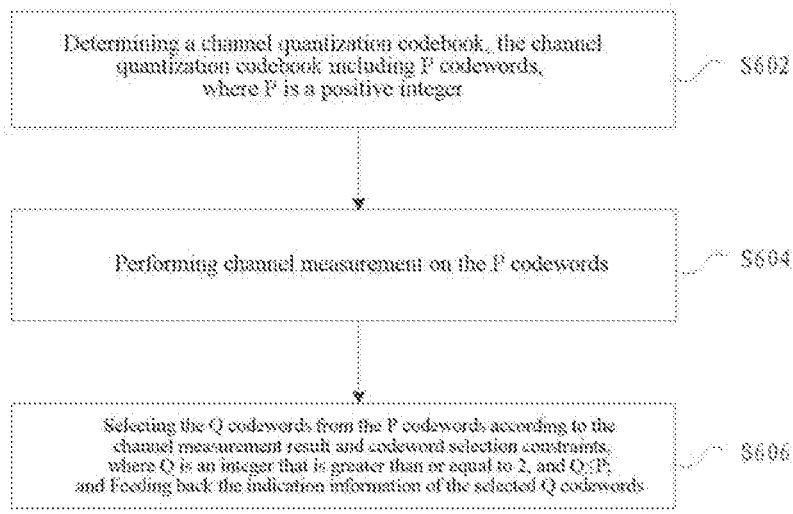
FIG. 6 is a second flowchart of a method for feeding back channel information according to an embodiment of the present invention.

In this embodiment, there is also provided a method for feeding back channel information running on the mobile terminal, and FIG. 6 is a second flowchart of a method for feeding back channel information according to an embodiment of the present invention. As shown in FIG. 6, the flow includes the following steps:

Step S602: determining a channel quantization codebook, the channel quantization codebook including P codewords, where P is a positive integer;

Step S604: performing channel measurement on the P codewords;

Step S606: selecting the Q codewords from the P codewords according to the result of the channel measurement and codeword selection constraints, where Q is an integer that is greater than or equal to 2, and Q≤P;

Step S608: feeding back the indication information of the selected Q codewords.

With the above-mentioned steps, the terminal performs channel measurement on the P codewords in the channel quantization codebook, and selects Q codewords from the P codewords, and then the terminal feeds back the indication information of the Q codewords to the base station. Thus, when the terminal feeds back a plurality of PMIs, the terminal may find multiple paths to improve the robustness of communication between the terminal and the base station, and solve the problem in the related art that a technology for selection of channel measurement resources is incapable of effectively corresponding to multiple paths, leading to low system robustness and transmission efficiency. Thus, when selecting channel measurement resources, it is possible to correspond to multiple paths, thus improving the system robustness and transmission efficiency.

Optionally, an execution body of the foregoing steps may be a terminal, but is not limited thereto.

In an optical embodiment, determining the channel quantization codebook includes one of: determining the channel quantization codebook according to an agreement; and determining the channel quantization codebook according to a configuration of the transmitting end. In this embodiment, the codebook may be a 4-antenna codebook in LTE Release 8, an 8Tx codebook in Release 10, or an enhanced 4-antenna codebook in Release 12, which are pre-agreed codebooks; and a 12/16 antenna codebook in Release 13 is a configuration codebook, and needs to notify information such as a first dimension N1 and a second dimension N2 of the codebook, a first dimension oversampling factor O1, a second dimension oversampling factor O2, and a subcodebook selection configuration to the receiving end; whether it is an existing codebook or a future codebook, an agreed codebook or a configurable codebook, the feedback of a plurality of codewords may be used to quantize the channel information, in this embodiment, the plurality of codewords may independently reflect the component information of a part of the channel.

In an optional embodiment, performing the channel measurement on the P codewords includes measuring a plurality of ports of the channel measurement pilot frequency to obtain a channel matrix. In this embodiment, the value of P may be the same as or different from the value of M.

In an optional embodiment, selecting the Q codewords from the P codewords according to the result of the channel measurement includes: determining a value of the Q configured by the transmitting end, where Q is an integer greater than or equal to 2; selecting the Q codewords from the P codewords according to the result of the channel measurement. In this embodiment, the value of Q may be the same as or different from the value of N. When N is greater than or equal to 2, the diversity gain of the multipath transmission may be obtained, obtaining a better performance. When N is greater than or equal to 2, the combined gain obtained by combining after multipath transmission has a better performance than that of a single path transmission; and when it is required to be combined, the receiving end selects Q codewords, measures the codewords, and then feeds back a phase difference information between some or all of the codewords. It may also be called a weighted combined information.

In an optional embodiment, selecting the Q codewords from the P codewords according to the result of the channel measurement includes: selecting the Q codewords from the P codewords according to the result of the channel measurement and the codeword selection constraints.

In an optical embodiment, the codeword selection constraints include: the Q codewords at least including Q' codewords belonging to different codeword groups, in which the P codewords are divided into E codeword groups, where Q' is an integer that is greater than or equal to 2 and less than or equal to E, and E is a positive integer.

In an optical embodiment, division of the E codeword groups is determined by at least one of the following manners: determining according to a configuration parameter of the channel quantization codebook, wherein the configuration parameter of the channel quantization codebook includes at least one of: a codebook dimension configuration parameter, an oversampling factor configuration parameter, a vector spacing configuration parameter, a codebook restriction configuration parameter; determining according to a transmission mode; determining according to a feedback mode; determining according to a configuration parameter of a measurement pilot frequency, wherein the configuration parameter of a measurement pilot frequency includes at least one of: a measurement pilot frequency type, a number of measurement pilot frequency ports, a measurement pilot frequency pattern; and determining the codeword groups according to a configuration instruction of the transmitting end.

In an optical embodiment, the codeword selection constraints include at least one of: the Q codewords at least include $Q_a$ codewords which are not less than a threshold Y, or distances of partial vectors included in the Q codewords are not less than the threshold Y; the Q codewords at least include $Q_b$ codewords which are not less than a threshold Z, or directional differences corresponding to partial vectors included in the Q codewords are not less than the threshold Z.

In an optical embodiment, the codeword selection constraints include: a relationship of codeword indices corresponding to any two codewords in the Q codewords satisfies an index relationship constraint rule.

In an optical embodiment, the codeword selection constraints are determined by: determining according to a configuration instruction signaling transmitted by the transmitting end.

In an optical embodiment, the method further includes: receiving a weighted combined parameter or a phase difference indication parameter of P1 codewords of P codewords transmitted by the transmitting end, where P1 is less than or equal to P.

In an optical embodiment, feeding back the indication information of the selected Q codewords includes: feeding back the indication information of the selected Q codewords on the uplink data channel or the uplink control channel.

Figure 7:
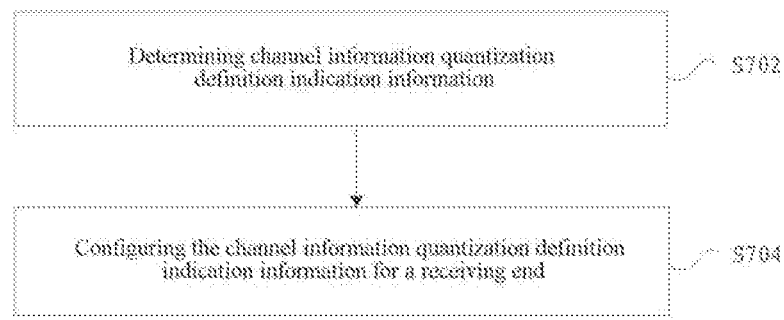
FIG. 7 is a third flowchart of a method for feeding back channel information according to an embodiment of the present invention.
Figure 8:
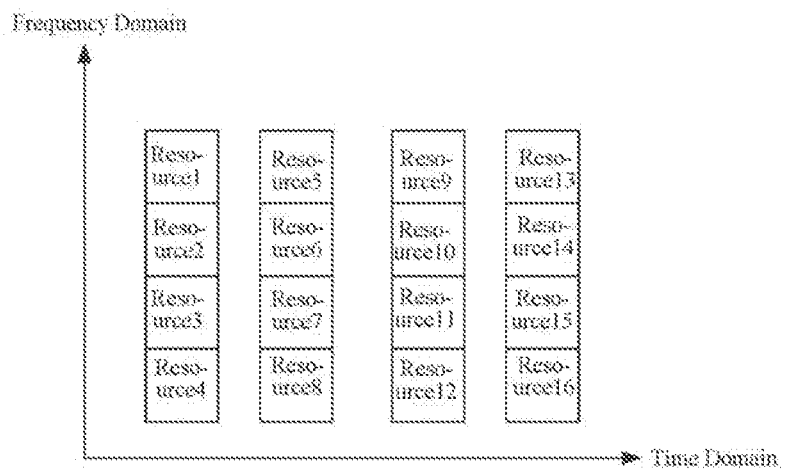
FIG. 8 is a first schematic view of a combination type of channel measurement resources according to an embodiment of the present invention.
Figure 9:
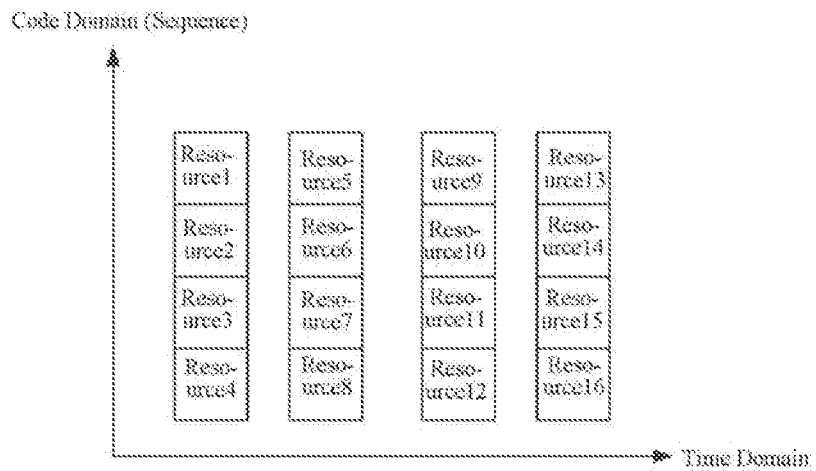
FIG. 9 is a second schematic view of a combination type of channel measurement resources according to an embodiment of the present invention.
Figure 10:
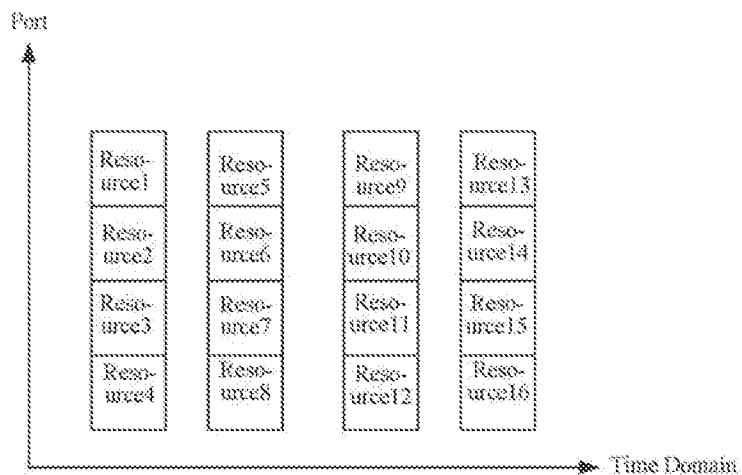
FIG. 10 is a third schematic view of a combination type of channel measurement resources according to an embodiment of the present invention.
Figure 11:
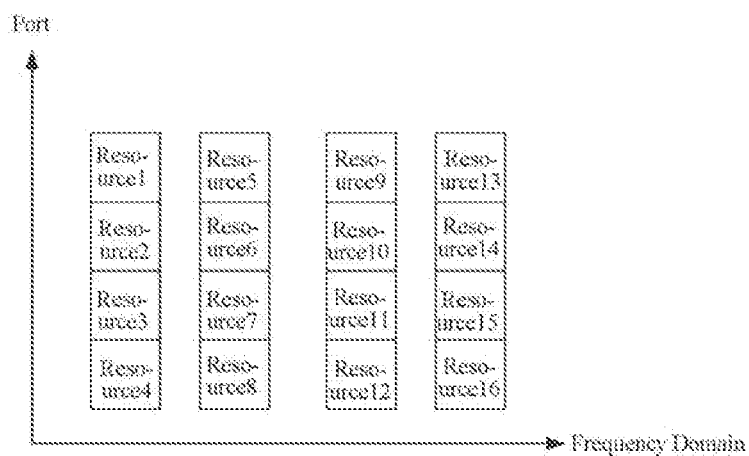
FIG. 11 is a fourth schematic view of a combination type of channel measurement resources according to an embodiment of the present invention.

In this embodiment, there is also provided a method for feeding back the channel information. FIG. 7 is a third flowchart of a method for feeding back channel information according to an embodiment of the present invention. As shown in FIG. 7, the flow includes the following steps:

Step S702: determining a channel information quantization definition indication information;

Step S704: configuring the channel information quantization definition indication information for a receiving end.

With the above-mentioned steps, the transmitting end (base station) determines channel information quantization definition indication information, and then configures the channel information quantization definition indication information for the receiving end. Through the channel information quantization definition indication information configured by the base station to the terminal, the terminal may perform channel measurement according to a plurality of channel measurement resources or a plurality of codewords, so that the problem in the related art that a technology for selection of channel measurement resources is incapable of effectively corresponding to multiple paths is solved, leading to low system robustness and transmission efficiency. Thus, when selecting channel measurement resources, it is possible to correspond to multiple paths, thus improving the system robustness and transmission efficiency.

Optionally, an execution body of the foregoing steps may be a base station, but is not limited thereto.

In an optical embodiment, the channel information quantization definition indication information includes at least one of a relationship definition indication information when selecting channel measurement resources; and a relationship definition indication information when selecting codewords.

In an optical embodiment, the relationship definition indication information when selecting channel measurement resources include at least one of a configuration information of a channel measurement resource group defined by selection of the channel measurement resources; a number information of the most selected channel measurement resources in the channel measurement resource group; an indication information defined by index relationship of the selected channel measurement resources; and an indication information defined by time frequency location relationship of the selected channel measurement resources.

In an optical embodiment, the relationship definition indication information when selecting codewords includes at least one of division information of a codeword group defined by selection of codewords; configuration information of codewords which cannot be selected at the same time; indication information defined by a distance relationship of the codewords; indication information defined by a directional relationship of the codewords.

In an optical embodiment, the method further includes at least one of determining a set of channel measurement resources, and configuring the set of channel measurement resources for the receiving end; determining a channel quantization codebook, and configuring the channel quantization codebook for the receiving end.

In the above embodiment, the problem that the existing multi-beam selection technology and the multi-codeword selection technology cannot effectively correspond to multiple paths is solved. The above problem makes it impossible to obtain the diversity gain and the combined gain of more paths, resulting in loss of robustness and transmission efficiency. In the solution used in this embodiment, some beams and PMIs are filtered out. According to the solution provided in this embodiment, a plurality of PMIs and a plurality of beams may be corresponding to different channel paths, so that the CSI quantization efficiency is higher and the transmission performance is effectively improved.

The present invention will be described in detail below with reference to specific embodiments:

First Specific Embodiment

In this embodiment, the receiving end may be a terminal, measures the channel information, and feeds the channel information back to the base station. The specific steps are as follows:

Step 10: determining a set of channel measurement resources, the set of resources including M resources, wherein the M channel measurement resources may be time domain resources, frequency domain resources, port resources, sequence resources or any combinations of various resources. As shown in FIG. 8, FIG. 9, FIG. 10, and FIG. 11, preferably, it may be a combination of time domain+frequency domain resources, time domain+code domain resources, port+time domain resources, port+frequency domain resources. As shown in FIG. 8, FIG. 9, FIG. 10, and FIG. 11, preferably, it may be a combination of time domain+frequency domain resources, time domain+code domain resources, port+time domain resources, port+frequency domain resources.

Figure 12:
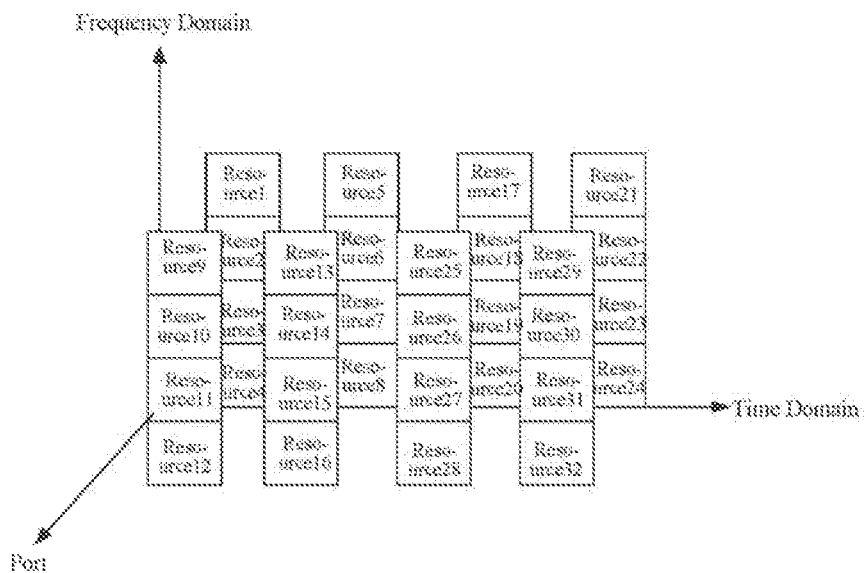
FIG. 12 is a fifth schematic view of a combination type of channel measurement resources according to an embodiment of the present invention.

It can also be a combination of resource types of more dimensions (for example, time domain+frequency domain+port resources), as shown in FIG. 12.

The beam may be bound to the channel measurement resource to some extent; for example, channel measurement resources 1-16 may correspond to beams IDs 1-16, or channel measurement resources 1-32 may correspond to beam IDs 1-32, so that it is equivalent to select the beam ID or to select the channel measurement resource, and feed back the channel measurement resource ID; it is only a distance, or the channel measurement resource ID may be a function of the beam ID, and the relationship between the beam ID and the channel measurement resource may not be necessarily a one-to-one corresponding relationship.

The M channel measurement resources may be configured by a transmitting end, the receiving end determines M channel measurement resources according to the measurement configuration indication information of the transmitting end; these channel measurement resources may be resources corresponding to the same cell (or sector) (corresponding to the channel measurement resources), or may be resources corresponding to different cells (or sectors); it may be the same transmitting node TP to send a signal, or may be different nodes IP to send signals; it may be the same transmit antenna/antenna group to send a signal, or may be different antennas/antenna groups to send signals.

Step 11: performing channel measurement on the M channel measurement resources.

If the transmission power is the same, the simple measurement method is to measure the received power on these resources. If the received power is large, the condition of the used channel is good, and the used beam is accurate. While if the transmission power is different, the transmission power needs to be considered to calculate the channel gain, which is generally a ratio of the received power to the transmitted power.

Step 12: selecting N channel measurement resources from the agreed set of resources according to the result of the channel measurement, where, preferably, N is greater than or equal to 2. The transmitting end may configure the value of N. In order to obtain a better measurement performance, N is greater than or equal to 2, and the diversity gain of multipath transmission can be obtained. When N is greater than or equal to 2, the combined gain obtained by combining after multipath transmission has a better performance than that of a single path transmission. When the combined gain is needed, the receiving end selects N channel measurement resources (corresponding to the above-mentioned channel measurement resources), measures the N resources, and feeds back phase difference information between some or all of resources. It may also be called weighted combined information.

There are a plurality of manners to select a plurality of resources, however, in either case, it is required to meet the resource selection constraint.

Preferably, one resource is selected from the M resources included in the set of channel measurement resources according to the result of the channel measurement, the channel gain on the resource is the largest, and the index information corresponding to the resource is I1.

The remaining M−1 resources are filtered according to the resource I1 selected according to a set of the resource selection constraints, and it is judged which resources cannot be simultaneously selected if the resource I1 is selected and reported, and resources that cannot be simultaneously selected with I1 are removed from a set of candidate resources, to obtain a first subset of channel measurement resources, which includes M1 resources.

One resource is selected from the M1 resources included in the first subset of channel measurement resources. The channel gain on the resource is the largest, and the index information corresponding to the resource is I2.

If N=2, the receiving end has completed selection of resources, and the selected resource indices are I1 and I2.

If N>2, the remaining M1−1 resources are filtered to determine which resources cannot be simultaneously selected if the resource I2 is selected and reported, and these resources are removed from the set of candidate resources to obtain a second subset of channel measurement resources, which contains M2 resources.

One resource is selected from the M2 resources included in the second subset of channel measurement resources, and the channel gain on the resource is the largest, and the index information corresponding to the resource is I3.

If N=3, the receiving end has completed selection of resources, and the selected resource indices are I1, I2 and I3.

If N>3, the remaining resources are also filtered, and the steps are similar to the above.

Step 13: feeding back the indication information of the selected N resources; the N resource indication information may be fed back by using the uplink data channel or the control channel.

Second Specific Embodiment

Figure 13:
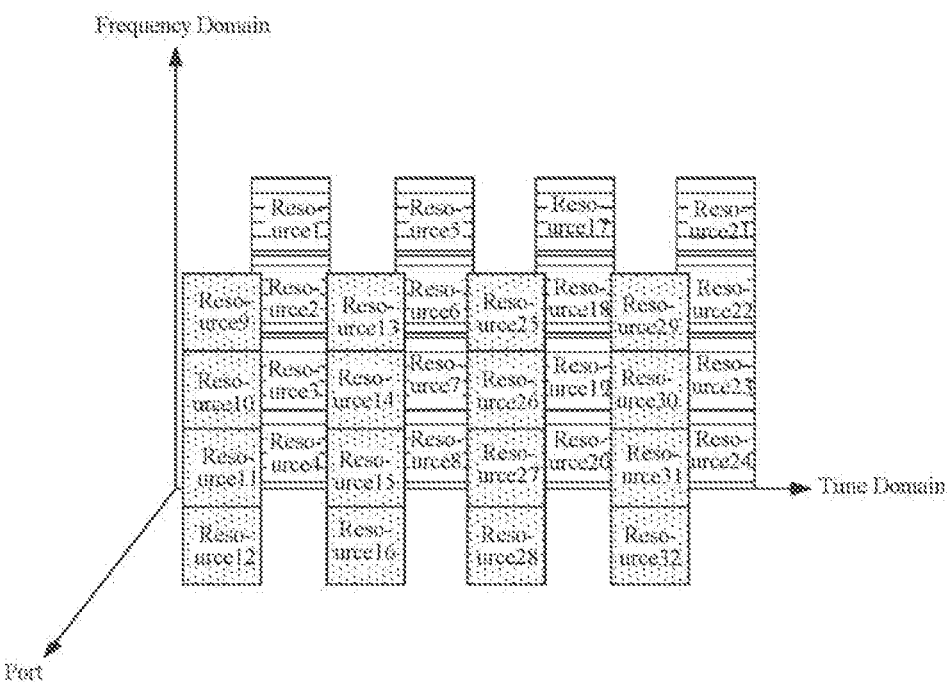
FIG. 13 is a first schematic view of division of channel measurement resource rule according to an embodiment of the present invention.

This specific embodiment mainly describes how to restrict selection of resources according to the resource selection constraint:

Preferably, the receiving end divides the M channel measurement resources into X resource groups, and the X resource groups may be divided by the following rules:

As shown in FIG. 13, a plurality of resources corresponding to the same port is divided into one group.

Figure 14:
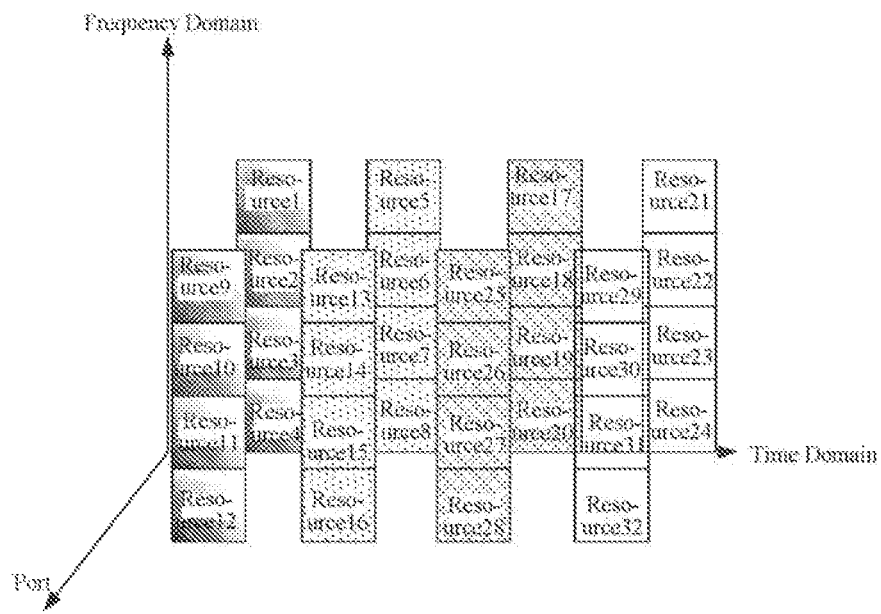
FIG. 14 is a second schematic view of division of channel measurement resource rule according to an embodiment of the present invention.

As shown in FIG. 14, a plurality of resources included in the same time domain resource unit are divided into one group; the domain resource unit may be: a symbol (group), a time slot (group), a subframe (group), and a TTI (group).

Figure 15:
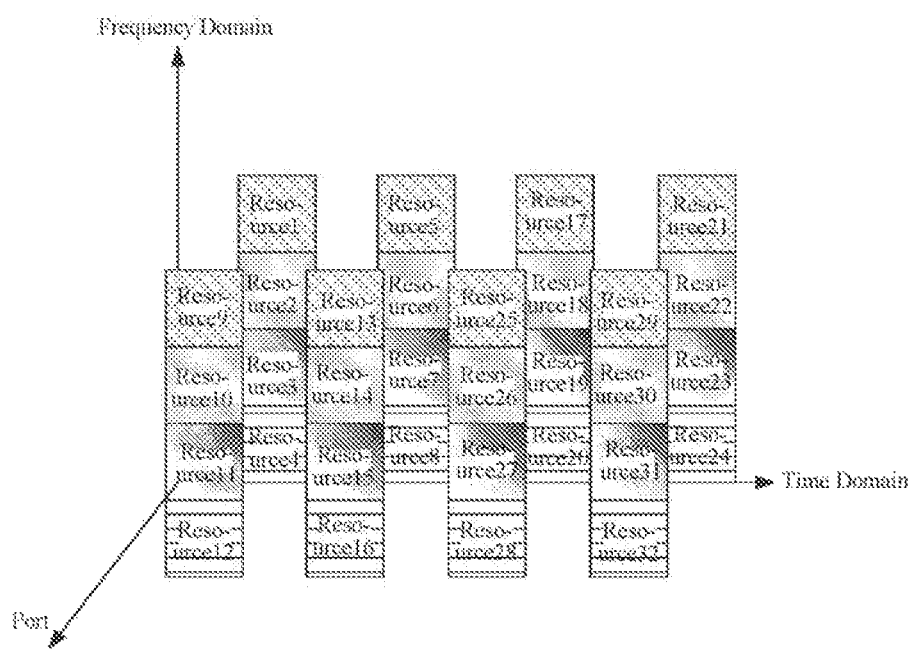
FIG. 15 is a third schematic view of division of channel measurement resource rule according to an embodiment of the present invention.

As shown in FIG. 15, a plurality of resources included in the same frequency domain resource unit is divided into one group.

Similarly, a plurality of resources included in the same RB may be divided into one group; or a plurality of resources corresponding to the same sequence may be divided into one group; or any combination of the foregoing manners may be used.

The manner of grouping may be pre-agreed by the transmitting end, or may be a manner in which the transmitting end uses signaling to notify the grouping; the purpose of grouping the channel measurement resources is to limit selection and feedback of resources, and preferably, it could be limited that at most one resource may be selected in one resource group; or it could be limited that two resources may be selected and reported in one resource group; a specific restriction of selection may be configured by the base station; each resource group may be configured with the same or different restrictions.

Third Specific Embodiment

The specific embodiment mainly describes the restriction of selection of resources according to the resource selection constraint;

The selection of a plurality of resources may be defined by some of the following conditions, for example:

There are at least $N_a$ resources belonging to different time domain resource units in N resources, where $N_a$ is an integer that is greater than or equal to 2 and less than or equal to N; the time domain resource unit may be: a symbol (group), a time slot (group), a sub-Frame (group), a TTI (group), etc.

In this specific embodiment, not all of the N resources belong to the same time domain resource unit, and at this time, beams transmitted in the same time domain resource may be adjacent beams; at this time, at least $N_a$ measurement resources belonging to different time domain resource units are selected, and $N_a$ being greater than or equal to 2 means to correspond to beams of different paths.

At least $N_b$ resources of the N resources correspond to different ports, where $N_b$ is an integer that is greater than or equal to 2 and less than or equal to N. In this specific embodiment, not all N resources belong to the same frequency domain resource unit, and at this time, beams transmitted in the same frequency domain resource may be adjacent beams; at this time, at least $N_b$ measurement resources belonging to different frequency domain resource units are selected, and $N_b$ being greater than or equal to 2 will correspond to beams of different paths.

Similar to the second specific embodiment above, there may be at least $N_c$ resources corresponding to different sequences in the N resources, and $N_c$ is an integer that is greater than or equal to 2 and less than or equal to N.

Similar to the foregoing specific embodiments, there may be at least $N_d$ resources corresponding to different RBs in the N resources, and $N_d$ is an integer that is greater than or equal to 2 and less than or equal to N.

Fourth Specific Embodiment

The specific embodiment defines selection of resources according to the resource selection constraint; the restriction rule may be: when the same time domain unit includes $M_a$ resources in the M resources, the selected N resources at most $n_a$ of the $M_a$ resources, where $n_a<N$. Therefore, too many measurement resources cannot be selected in the same time domain unit, and the total number of selectable resources must be selected, so that it may also be selected in other time domain units, and beams transmitted by different time domain units are beams with larger spatial directional differences.

When the same port is corresponding to $M_b$ resources in the M resources, the selected N resources at most $n_b$ of the $M_b$ resources, where $n_b<N$. Therefore, too many measurement resources cannot be selected in the same port, and the total number of selectable resources must be selected, so that it may also be selected in other ports, and beams transmitted by different ports are beams with larger spatial directional differences.

When the same sequence is corresponding to $M_c$ resources in the M resources, the selected N resources at most n of the $M_c$ resources, where $n_c<N$. Therefore, too many measurement resources cannot be selected in the same sequence, and the total number of selectable resources must be selected, so that it may also be selected in other sequences, and beams transmitted by different sequences are beams with larger spatial directional differences.

Further, the resource selection constraint is that when the same RB includes $M_d$ resources in the M resources, the selected N resources at most include $n_d$ of the $M_d$ resources, where $n_c<N$, and thus the resources corresponding to the same RB cannot be selected too much, and the total number of selectable resources must be selected, so that the resources corresponding to other RBs may also be selected, and beams transmitted by different RBs are beams with larger spatial directional differences.

Fifth Specific Embodiment

The specific embodiment mainly describes how to restrict selection of resources according to the resource selection constraint; the restriction rule may be that, a relationship of resource indices corresponding to any two of the N resources satisfies the "index relationship constraint rule"; the rule may be configured by a transmitting end, preferably, its form is shown in Table 1:

TABLE 1

| the selected resource | the corresponding restricted resource |
|---|---|
| resource i | resource i − 1; resource i − 2; resource i + 1; resource i + 2 |

Or shown in Table 2:

TABLE 2

| the selected resource | the corresponding restricted resource |
|---|---|
| resource i | resource i − 1; resource i + k; resource i + 1; resource i + k |

In summary, the restricted resource index is a function of the selected resource index. Specifically, the transmitting end may determine how to configure the restriction function according to the weight of the beam; if the beam is denser, the restricted resources are more.

The case in the foregoing embodiment is a similar restriction function for each resource. In another case, the base station flexibly configures its corresponding restricted resources for different measurement resources, as shown in Table 3:

TABLE 3

| the selected resource | the corresponding restricted resource |
| --- | --- |
| resource 1 | resource 1, resource 2, resource 17, resource 33 |
| resource 2 | resource 1, resource 3, |
| resource 3 | resource 2, resource 4, resource 19, |
| resource 4 | resource 3, resource 5 |
| . . . | |

Or, a relationship of the resource indices corresponding to any two of the N resources satisfies the "time-frequency resource location interval constraint rule"; the rule may be configured by the transmitting end, and preferably, the form is as shown in Table 4 and Table 5:

TABLE 4

| the selected resource | the corresponding restricted resource |
| --- | --- |
| resource i | resources on the adjacent time domain units on the time domain |

TABLE 5

| the selected resource | the corresponding restricted resource |
| --- | --- |
| resource i | resources on the adjacent frequency domain units on the frequency domain |

Sixth Specific Embodiment

In the present embodiment and the following seventh and eighth embodiments, M corresponds to the above P, N corresponds to the above Q, and X corresponds to the above E.

Step 20: determining a channel quantization codebook, wherein the codebook includes M (corresponding to the P) codewords; the codebook may be determined according to a pre-agreed codebook, or may be determined according to a configuration of the transmitting end; for example, a 4-antenna codebook in LTE Release 8, an 8Tx codebook in Release 10, or an enhanced 4-antenna codebook in Release 12 are pre-agreed codebook; and Release 13 12/16 antenna codebook is configuration codebook, and needs to notify information such as a first dimension N1 and a second dimension N2 of the codebook, a first dimension oversampling factor O1, a second dimension oversampling factor O2, and a subcodebook selection configuration to the receiving end; whether it is an existing codebook or a future codebook, an agreed codebook or a configurable codebook, the feedback of a plurality of codewords may be used to quantize the channel information, in this embodiment, the plurality of codewords may independently reflect the component information of a part of the channel.

Step 21: performing measurement on the channel; the channel measurement may be to measure a plurality of ports of the channel measurement pilot frequency to obtain a channel matrix.

Step 22: selecting N (corresponding to the above Q) codewords from the codebook to represent channel information; N is greater than or equal to 2; the transmitting end may configure the value of N, in order to obtain a better performance, only if N is required to be greater than or equal to 2, the diversity gain of multipath transmission can be obtained, and if N is greater than or equal to 2, the combined gain obtained by combining after multipath transmission has a better performance than that of a single path transmission; if the combined gain is needed, the receiving end selects N resources, measures the resources, and feeds back phase difference information between some or all of the resources. It may also be called weighted combined information.

There are several manners to select a plurality of codewords, and the plurality of selection manners need to meet the "codeword selection restrictions".

Preferably, one codeword is selected from the M codewords included in the codebook according to the result of the channel measurement, and the performance is best when the codeword is used for precoding, and the index information corresponding to the codeword is I1.

The remaining M−1 codewords are filtered according to the "codeword selection constraints" and the codeword I1 selected from the codebook, and it is judged which codewords cannot be simultaneously selected if the codeword I1 is selected and reported, and they are removed from a set of candidate codewords to obtain a first subset of codebooks which contains M1 codewords.

One codeword is selected from the M1 codewords included in the first subset of codebooks, and the performance is best when the codeword is used for precoding, and the index information corresponding to the codeword is I2.

If N=2, the receiving end has completed selection of codewords, and the selected codeword indices are I1 and I2.

If N>2, the remaining M1−1 codewords are filtered to determine, if the codeword 12 is selected and reported, which codewords cannot be simultaneously selected, and are removed from the set of candidate codewords to obtain a second subset of codebooks, which contains M2 codewords.

One codeword is selected from the M2 codewords included in the second subset of codebooks, and the performance is best when the codeword is used for precoding, and the index information corresponding to the codeword is I3.

If N=3, the receiving end has completed selection of codewords, and the selected codeword indices are I1, I2 and I3.

If N>3, the remaining codewords are further filtered, and the steps are the same as above.

Step 13: feeding back indication information of the selected N codewords; N codeword indication information may be fed back in the uplink data channel or control channel.

Seventh Specific Embodiment

The specific embodiment defines selection of codewords according to the codeword selection constraints; the codeword selection constraints are: determining X (corresponding to E) codeword groups, and at least N' of the N codewords belong to different codeword groups, where N' is an integer that is greater than or equal to 2 and less than or equal to N; preferably, the grouping manner may be that: the codewords sharing the same first PMI index are grouped into one group, and the 8Tx code defined by Release 10 of LTE (dual PMI codebook, two indices indicate the same codeword), and RI/layer=1 is used as an example; the following scalar/vector is defined: $\phi_n = e^{j\pi n/2}$, $v_m[1 \ e^{j2\pi m/32} \ e^{j4\pi m/32} \ e^{j6\pi m/32}]$. The codeword is defined based on the above variables. The codeword model and the codebook are shown in Table 6.

TABLE 6

| | $i_2$ | | | | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | $i_2$ | | | | | | | |
|---|---|---|---|---|---|---|---|---|
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |

The manner of the foregoing grouping $$W_{m,n}^{(1)} = \frac{1}{\sqrt{8}} \begin{bmatrix} V_m \\ \varphi_n V_m \end{bmatrix}$$

may be that 16 codewords corresponding to i1=0 is grouped into one group, and 16 codewords corresponding to i1=1 are grouped into one group, . . . 16 codewords corresponding to i1=15 are grouped into one group. The manner of such grouping may be pre-agreed by the transmitting end; or the manner in which the transmitting end uses signaling to notify the grouping, as shown in Table 7;

TABLE 7

| codeword group | codeword included |
|---|---|
| codeword group 1 | i1 = 0, 1, 2, 3 i2 = 0~15 |
| codeword group 2 | i1 = 4, 5, 6, 7 i2 = 0~15 |
| codeword group 3 | i1 = 8, 9, 10, 11 i2 = 0~15 |
| codeword group 4 | i1 = 12, 13, 14, 15 i2 = 0~15 |

If it is a 3D codebook, and the codebook parameter may be configured, the grouping will be more complicated, and the grouping manner may be determined according to codebook configuration parameters; different codebook configuration parameters are grouped in different manners, as shown in Table 8:

TABLE 8

| oversampling factor configuration parameter | codeword included |
|---|---|
| O1 = 2, O2 = 4 | codeword grouping mode/rule 1 |
| O1 = 4, O2 = 4 | codeword grouping mode/rule 2 |
| O1 = 4, O2 = 8 | codeword grouping mode/rule 3 |
| O1 = 8, O2 = 4 | codeword grouping mode/rule 4 |

Or, as shown in Table 9:

TABLE 9

| Parameter of first/second dimension configuration | codeword included |
|---|---|
| N1 = 2, N2 = 4 | codeword grouping mode/rule 5 |
| N1 = 4, N2 = 4 | codeword grouping mode/rule 6 |
| N1 = 4, N2 = 8 | codeword grouping mode/rule 7 |
| N1 = 8, N2 = 4 | codeword grouping mode/rule 8 |

Or, as shown in Table 10:

TABLE 10

| parameter of subcodebook configuration | codeword included |
|---|---|
| subcodebook configuration 1 | codeword grouping mode/rule 9 |
| subcodebook configuration 2 | codeword grouping mode/rule 10 |
| subcodebook configuration 3 | codeword grouping mode/rule 11 |
| subcodebook configuration 4 | codeword grouping mode/rule 12 |

The grouping manner may also be determined according to the transmission mode/feedback mode, and different modes are grouped differently, as shown in Table 11:

TABLE 11

| parameter of transmission mode | codeword included |
|---|---|
| transmission mode 1 | codeword grouping mode/rule 13 |
| transmission mode 2 | codeword grouping mode/rule 14 |
| transmission mode 3 | codeword grouping mode/rule 15 |
| transmission mode 4 | codeword grouping mode/rule 16 |

Or, as shown in Table 12:

TABLE 12

| parameter of feedback mode | codeword included |
|---|---|
| feedback mode 1 | codeword grouping mode/rule 17 |
| feedback mode 2 | codeword grouping mode/rule 18 |
| feedback mode 3 | codeword grouping mode/rule 19 |
| feedback mode 4 | codeword grouping mode/rule 20 |

The grouping manner may also be determined according to a configuration parameter of a measurement pilot frequency, different configuration parameters of a measurement pilot frequency are grouped differently, as shown in Table 13:

TABLE 13

| measurement pilot frequency type | codeword included |
|---|---|
| precoding measurement pilot frequency | codeword grouping mode/rule 22 |
| non-precoding measurement pilot frequency | codeword grouping mode/rule 23 |

Or, as shown in Table 14:

TABLE 14

| measurement pilot frequency type | codeword included |
|---|---|
| periodic measurement pilot frequency | codeword grouping mode/rule 24 |
| aperiodic measurement pilot frequency | codeword grouping mode/rule 25 |

Or, as shown in Table 15:

TABLE 15

| the number of measurement pilot frequency ports | codeword included |
|---|---|
| 4 | codeword grouping mode/rule 26 |
| 8 | codeword grouping mode/rule 27 |
| 12/16 | codeword grouping mode/rule 28 |
| 20/24/28/32 | codeword grouping mode/rule 29 |

The codeword grouping method/rule may be agreed or configured by the transmitting end; the purpose of the codeword grouping is to define selection and feedback of the codeword, preferably, at most one codeword is limited to be selected within one codeword group; two codewords are selected to be reported in one codeword group; specific selection restrictions may be configured by the base station; each codeword group may be configured with the same or different restrictions.

Eighth Specific Embodiment

The codeword selection constraints may further be that: at least $N_a$ codewords in the N codewords or a partial vector included in the codewords has a distance not less than a threshold Y; the distance herein may have a plurality of spatial distance definitions, commonly used definitions are European spatial distance, chord distance, etc. The codeword selection process in this embodiment is more specifically, i.e., selecting one codeword from the M codewords included in the codebook according to the result of the channel measurement, and the performance is best when the codeword is used for precoding, the index information corresponding to the codeword is I1; the chord distance of the remaining M−1 codewords and the selected codeword I1 is determined, and when the chord distance is less than the threshold Y, it is screened; after screening the codewords that do not satisfy the chord distance condition, a first subset of codebooks is obtained, which includes M1 codewords; and one codeword is selected from M1 codewords included in the first subset of codebooks, and The performance is best when the codeword is used for precoding, the index information corresponding to the codeword is I2.

If N=2, the receiving end has completed selection of codewords, and the selected codeword indices are I1 and I2.

If N>2, the remaining M1−1 codewords are filtered to determine, if the codeword 12 is selected and reported, which remaining codewords do not satisfy the chord distance condition, and are removed from the set of candidate codewords to obtain a second subset of codebooks, which contains M2 codewords.

One codeword is selected from the M2 codewords included in the second subset of codebooks, and the performance is best when the codeword is used for precoding, and the index information corresponding to the codeword is I3.

If N=3, the receiving end has completed selection of codewords, and the selected codeword indices are I1, I2 and I3.

If N>3, the remaining codewords are further filtered, and the steps are similar to the above.

The distance restriction condition may be changed to the direction difference corresponding to at least $N_b$ codewords or the partial vector included therein in the N codewords is not less than the threshold Z.

The 8Tx codebook defined by Release 10 of LTE (dual PMI codebook, two indices indicating the same codeword), RI/layer=1 is taken as an example; the following scalar/vector is defined. The codeword is defined based on the above variables, The codeword model and the codebook are shown in Table 16:

TABLE 16

| | | | | $i_2$ | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | | | | $i_2$ | | | | |
|---|---|---|---|---|---|---|---|---|
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |

Here, $$W_{m,n}^{(1)} = \frac{1}{\sqrt{8}} \begin{bmatrix} v_m \\ \varphi_n v_m \end{bmatrix}.$$

When a codeword is selected, the value of $e^{2\pi m/32}$ is determined according to PMI, and the difference from other codewords is calculated. If the phase of other codewords does not satisfy the phase difference condition, it needs to be screened out.

Ninth Specific Embodiment

There is also a case where the transmitting end configures the codeword selection restriction, and the base station flexibly configures the corresponding restricted codewords for different codewords, as shown in Table 17:

TABLE 17

| the selected codeword | the corresponding restricted codeword |
|---|---|
| codeword 1 | codeword 1, codeword 2, codeword 17, codeword 33 |
| codeword 2 | codeword 1, codeword 3, |
| codeword 3 | codeword 2, codeword 4, codeword 19, |
| codeword 4 | codeword 3, codeword 5 |
| . . . | |

This configuration may also be extended to the codebook of the dual PMI.

Through the description of the above embodiments, those skilled in the art can clearly understand that the method according to the above embodiments can be implemented by means of software and a necessary general hardware platform, and of course, by hardware. However, in many cases, the former is a better implementation. Based on such an understanding, the part of the technical solution of the present invention, which is essential or contributes to the prior art, may be embodied in the form of a software product stored in a storage medium (such as ROM/RAM, disk, optical disc), including a number of instructions for enabling a terminal device (which may be a cell phone, a computer, a server, or a network device, etc.) to perform the methods described in various embodiments of the present invention.

In the present embodiment, there is provided a device for feeding back channel information, configured to implement the foregoing embodiments and preferred embodiments, which have been described and will not be repeated. As used below, the term "module" may implement a combination of software and/or hardware of a predetermined function. The devices described in the following embodiments are preferably implemented in software, however, hardware, or a combination of software and hardware, is also possible and contemplated.

Figure 16:
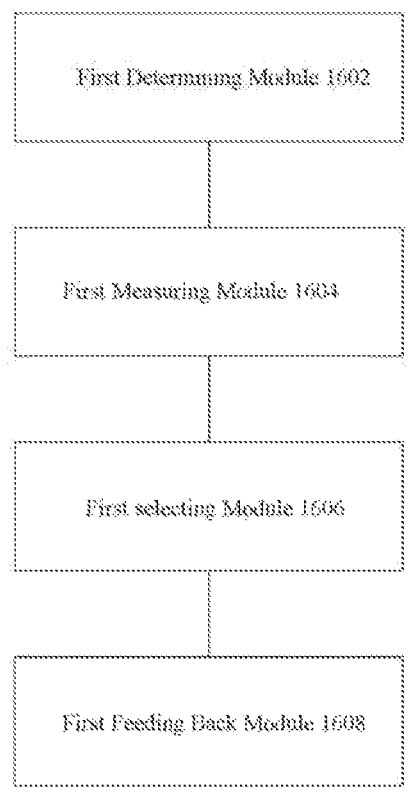
FIG. 16 is a first structural block diagram of a device for feeding back channel information according to an embodiment of the present invention.

FIG. 16 is a first structural block diagram of a device for feeding back channel information according to an embodiment of the present invention, as shown in FIG. 16, the device includes: a first determining module 1602, a first measuring module 1604, a first selecting module 1606 and a first feeding back module 1608. The device is described in detail below, which includes:

a first determining module 1602 configured for determining a set of channel measurement resources, the set of channel measurement resources including M channel measurement resources, where M is a positive integer; a first measuring module 1604, connected to the first determining module 1602, and configured for performing channel measurement on the M channel measurement resources; a first selecting module 1606, connected to the first measuring module 1604, and configured for selecting the N channel measurement resources from the M channel measurement resources according to channel measurement result, where N is a positive integer, and N≤M; a first feeding back module 1608, connected to the first selecting module 1606, and configured for feeding back indication information of the selected N channel measurement resources.

In an optical embodiment, a processor 402 of the mobile terminal shown in FIG. 4 may perform an action executed in the first determining module 1602, the first measuring module 1604, the first selecting module 1606 and the first feeding back module 1608, i.e., the processor 402 determines a set of channel measurement resources; channel measurement is performed on the M channel measurement resources; after selecting N channel measurement resources from M channel measurement resources according to the result of the channel measurement and the resource selection constraint, an indication information of the selected N channel measurement resources is fed back.

In an optical embodiment, the first selecting module includes: a first selecting unit, configured for selecting the N channel measurement resources from the M channel measurement resources according to the result of the channel measurement and the resource selection constraint.

In an optical embodiment, the device further includes: a grouping module, configured for grouping the M channel measurement resources or the N channel measurement resources, and determining quality information of the channel measurement resources required to be fed back according to a manner of grouping.

In an optical embodiment, the M channel measurement resources include at least one of the following resources: a port resource; a beam resource; a sequence resource; a time domain resource; a frequency domain resource.

In an optical embodiment, the resource selection constraint includes: at least N' channel measurement resources respectively belonging to different channel measurement resource groups are included in the N channel measurement resources, the M channel measurement resources being divided into X channel measurement resource groups, where N' is an integer that is greater than or equal to 2 and less than N, and X is a positive integer.

In an optical embodiment, the X channel measurement resource groups are divided according to at least one of: a plurality of channel measurement resources corresponding to the same port being divided into one group; a plurality of channel measurement resources corresponding to the same sequence being divided into one group; a plurality of channel measurement resources included in the same time domain resource unit being divided into one group; a plurality of channel measurement resources included in the same frequency domain resource unit being divided into one group; a plurality of channel measurement resources included in the same resource block RB being divided into one group; determining the X channel measurement resource groups according to configuration signaling of the transmitting end.

In an optical embodiment, the resource selection constraint includes one of: the N channel measurement resources at least include $N_a$ channel measurement resources belonging to different time domain resource units, where $N_a$ is an integer that is greater than or equal to 2 and less than or equal to N, and the time domain resource unit includes at least one of: a symbol, a symbol group, a time slot, a time slot group, a subframe, a subframe group, a transmission time interval TTI, a transmission time interval TTI group; the N channel measurement resources at least include $N_b$ channel measurement resources corresponding to different ports, where $N_b$ is an integer that is greater than or equal to 2 and less than or equal to N; the N channel measurement resources at least include $N_c$ channel measurement resources corresponding to different sequences, where $N_c$ is an integer that is greater than or equal to 2 and less than or equal to N; the N channel measurement resources at least include $N_d$ channel measurement resources corresponding to different resource blocks RB, where $N_d$ is an integer that is greater than or equal to 2 and less than or equal to N.

In an optical embodiment, the resource selection constraint includes one of: when the same time domain resource unit includes $M_a$ channel measurement resources of the M channel measurement resources, the N channel measurement resources at most including $n_a$ channel measurement resources of the $M_a$ channel measurement resources, where $n_a$ is less than N; when the same port corresponds to $M_b$ channel measurement resources of the M channel measurement resources, the N channel measurement resources at most including $n_b$ channel measurement resources of the $M_b$ channel measurement resources, where $n_b$ is less than N; when the same sequence corresponds to $M_c$ channel measurement resources of the M channel measurement resources, the N channel measurement resources at most including $n_c$ channel measurement resources of the $M_c$ channel measurement resources, where $n_c$ is less than N; when the same RB includes $M_d$ channel measurement resources of the M channel measurement resources, the N channel measurement resources at most including $n_d$ channel measurement resources of the $M_d$ channel measurement resources, where $n_d$ is less than N.

In an optical embodiment, the resource selection constraint includes one of: a relationship of the channel measurement resource indices corresponding to any two channel measurement resources of the N channel measurement resources satisfies an index relationship constraint rule, the index relationship constraint rule being configured by a transmitting end; an interval of locations of the time-frequency resources of the channel measurement resources corresponding to any two of the N channel measurement resources satisfies the time-frequency resource location interval constraint rule, the time-frequency resource location interval constraint rule being configured by a transmitting end.

In an optical embodiment, the resource selection constraint is determined by one of the following manners: determining according to configuration instruction signaling of the transmitting end; determining according to channel measurement resource configuration parameters transmitted by the transmitting end.

In an optical embodiment, the channel measurement resource configuration parameters include at least one of: the number M of the M channel measurement resources; a configuration parameter for the subset included in the set of channel measurement resources; resource location configuration parameters of the M channel measurement resources.

In an optical embodiment, the method further includes: a first receiving module, configured for receiving a weighted combined parameter or a phase difference indication parameter of N1 channel measurement resources in the N channel measurement resources transmitted by the transmitting end, where N1 is less than or equal to N.

Figure 17:
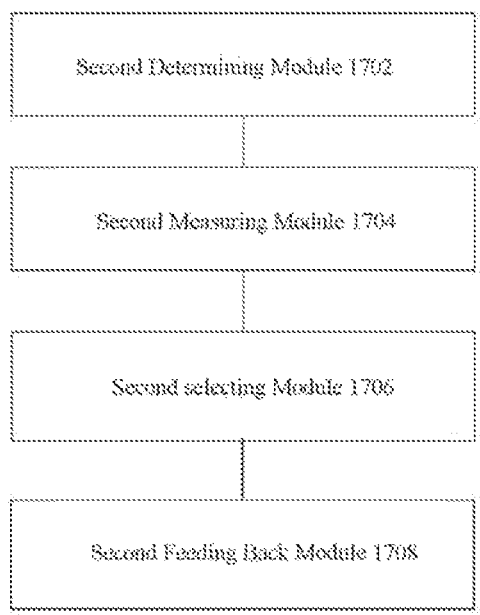
FIG. 17 is a second structural block diagram of a device for feeding back channel information according to an embodiment of the present invention.

FIG. 17 is a second structural block diagram of a device for feeding back channel information according to an embodiment of the present invention, as shown in FIG. 17, the device includes: a second determining module 1702, a second measuring module 1704, a second selecting module 1706 and a second feeding back module 1708. The device is described in detail below, which includes:

a second determining module 1702, configured for determining a channel quantization codebook, the channel quantization codebook including P codewords, where P is a positive integer; a second measuring module 1704, connected to the second determining module 1702, and configured for performing channel measurement on the P codewords; a second selecting module 1706, connected to the second measuring module 1704, and configured for selecting Q codewords from the P codewords according to the result of the channel measurement, where Q is a positive integer, and Q≤P; a second feeding back module 1708, connected to the second selecting module 1706, and configured for feeding back the indication information of the selected Q codewords.

In an optical embodiment, a processor 402 of the mobile terminal shown in FIG. 4 may perform an action executed in the second determining module 1702, the second measuring module 1704, the second selecting module 1706 and the second feeding back module 1708, i.e., the processor 402 determines a channel quantization codebook, and performs channel measurement on the P codewords; after selecting Q codewords from the P codewords according to the result of the channel measurement, the indication information of the selected Q codewords is fed back.

In an optical embodiment, the codeword selection constraints include: the Q codewords at least including Q' codewords belonging to different codeword groups, in which the P codewords are divided into E codeword groups, where Q' is an integer that is greater than or equal to 2 and less than or equal to E, and E is a positive integer.

In an optical embodiment, division of the E codeword groups is determined by at least one of the following manners: determining according to a configuration parameter of the channel quantization codebook, wherein the configuration parameter of the channel quantization codebook includes at least one of: codebook dimension configuration parameter, oversampling factor configuration parameter, vector spacing configuration parameter, codebook restriction configuration parameter; determining according to a transmission mode; determining according to a feedback mode; determining according to a configuration parameter of a measurement pilot frequency, wherein the configuration parameter of a measurement pilot frequency includes at least one of: a measurement pilot frequency type, the number of measurement pilot frequency ports, a pattern of measurement pilot frequency; determining the codeword groups according to a configuration instruction of the transmitting end.

In an optical embodiment, the codeword selection constraints include at least one of: the Q codewords at least include $Q_a$ codewords which are not less than a threshold Y, or distances of partial vectors included in the Q codewords are not less than the threshold Y; the Q codewords at least include $Q_b$ codewords which are not less than a threshold Z, or directional differences corresponding to partial vectors included in the Q codewords are not less than the threshold Z.

In an optical embodiment, the codeword selection constraints include: a relationship of codeword indices corresponding to any two codewords in the Q codewords satisfies an index relationship constraint rule.

In an optical embodiment, the codeword selection constraints are determined by: determining according to configuration instruction signaling transmitted by the transmitting end.

In an optical embodiment, the method further includes: a second receiving module, configured for receiving a weighted combined parameter or a phase difference indication parameter of P1 codewords in the P codewords transmitted by the transmitting end, where P1 is less than or equal to P.

In an optical embodiment, feeding back the indication information of the selected Q codewords includes: feeding back the indication information of the selected Q codewords on the uplink data channel or the uplink control channel.

Figure 18:
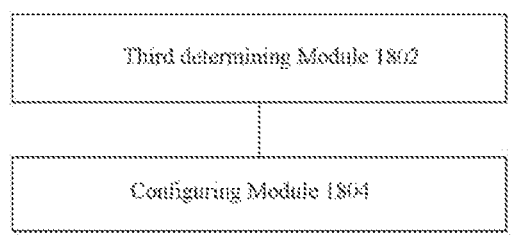
FIG. 18 is a third structural block diagram of a device for feeding back channel information according to an embodiment of the present invention.

FIG. 18 is a third structural block diagram of a device for feeding back channel information according to an embodiment of the present invention, as shown in FIG. 18, the device includes: a third determining module 1802 and a configuring module 1804. The device is described in detail below, which includes:

a third determining module 1802, configured for determining channel information quantization definition indication information; a configuring module 1804, connected to the third determining module 1802, and configured for configuring the channel information quantization definition indication information for the receiving end.

In an optical embodiment, a processor of the base station may perform an action executed in the third determining module 1802 and the configuring module 1804, i.e., the processing device in the base station determining channel information quantization definition indication information, and configuring the channel information quantization definition indication information for the receiving end.

In an optical embodiment, the channel information quantization definition indication information includes at least one of relationship definition indication information when selecting channel measurement resources; relationship definition indication information when selecting codewords.

In an optical embodiment, the relationship definition indication information when selecting channel measurement resources include at least one of: configuration information of a channel measurement resource group defined by selection of the channel measurement resources; information of the number of the most selected channel measurement resources in the channel measurement resource group; indication information defined by index relationship of the selected channel measurement resources; indication information defined by time frequency location relationship of the selected channel measurement resources.

In an optical embodiment, the relationship definition indication information when selecting codewords includes at least one of division information of a codeword group defined by selection of codewords; configuration information of codewords which cannot be selected at the same time; indication information defined by a distance relationship of the codewords; indication information defined by a directional relationship of the codewords.

In an optical embodiment, the method further includes at least one of determining a set of channel measurement resources, and configuring the set of channel measurement resources for the receiving end; determining a channel quantization codebook, and configuring the channel quantization codebook for the receiving end.

According to another embodiment of the present invention, there is also provided a feedback system for channel information, the system including the above-mentioned terminal and a base station, wherein the terminal includes a processor, and the base station includes a processing device. The processor in the terminal is configured for determining a set of channel measurement resources, performing channel measurement on the M channel measurement resources, selecting N channel measurement resources from the M channel measurement resources according to the result of the channel measurement and the resource selection constraint, and then feeding back the indication information of the selected N channel measurement resources. The processor in the terminal may be further configured for determining a channel quantization codebook, performing channel measurement on the P codewords, selecting the Q codewords from the P codewords according to the result of the channel measurement, and then feeding back the indication information of the selected Q codewords. The processing device in the base station is configured to determine channel information quantization definition indication information, and configure channel information quantization definition indication information for the receiving end.

It should be noted that each of the modules may be implemented by software or hardware. The latter may be implemented by, but not limited to, the following manners: the foregoing modules being all located in the same processor; or, the modules are located in different processors in any combination.

Embodiments of the present invention also provide a storage medium. Optionally, in the embodiment, the above storage medium may be configured to store procedure codes for performing the above steps.

Optionally, in the embodiment, the foregoing storage medium may include, but is not limited to, various media that may store procedure codes, such as a USB flash drive, a Read-Only Memory (ROM), and a Random Access Memory (RAM), a hard disk, a disk, or an optical disk.

Optionally, in this embodiment, the processor performs the above steps according to the stored procedure code in the storage medium.

For example, the specific examples in this embodiment may refer to the foregoing embodiments and the examples described in the optional embodiments, and details are not repeated herein.

It will be apparent to those skilled in the art that the various modules or steps of the present invention described above can be implemented by a general-purpose computing device, and can be centralized on a single computing device or distributed across a network formed by a plurality of computing devices. Optionally, they may be implemented by procedure codes executable by the computing device such that they may be stored in the storage device and executed by the computing device and, in some cases, may be perform steps shown or described in different sequences from the sequence herein. Or, they are separately fabricated into individual integrated circuit modules, or a plurality of modules or steps thereof are fabricated as a single integrated circuit module. Thus, the present invention is not limited to any specific combination of hardware and software.

The above description is only the preferred embodiment of the present invention, and is not intended to limit the present invention. For those skilled in the art, there may be various modifications and changes, and any modifications, equivalent substitutions, improvements, etc. made within the spirit and scope of the present invention are intended to be included within the scope of the present invention.

INDUSTRIAL APPLICABILITY

As described above, a method and device for feeding back channel information provided by the embodiments of the present invention have the following beneficial effects of: solving the problem in the related art that a technology for selection of channel measurement resources is incapable of effectively corresponding to multiple paths, leading to low system robustness and transmission efficiency, achieving an effect of being able to correspond to multiple paths when selecting channel measurement resources, and then improving the system robustness and transmission efficiency.

What is claimed is:

1. A method for feeding back channel information comprising:

determining a set of channel measurement resources, wherein the set of channel measurement resources comprises M channel measurement resources, and M is a positive integer;

performing a channel measurement on the M channel measurement resources;

selecting N channel measurement resources from the M channel measurement resources according to a result of the channel measurement, where N is a positive integer, and N≤M; and feeding back an indication information of the selected N channel measurement resources, wherein selecting N channel measurement resources from the M channel measurement resources according to the result of the channel measurement comprising: selecting the N channel measurement resources from the M channel measurement resources according to the result of the channel measurement and a resource selection constraint.

2. The method according to claim 1, wherein the method further comprises:

grouping the M channel measurement resources or the N channel measurement resources, and determining quality information of the channel measurement resources required to be fed back according to a manner of grouping.

3. The method according to claim 1, wherein the resource selection constraint comprises:

at least N' channel measurement resources respectively belonging to different channel measurement resource groups are comprised in the N channel measurement resources, the M channel measurement resources being divided into X channel measurement resource groups, where N' is an integer that is greater than or equal to 2 and less than N, and X is a positive integer.

4. The method according to claim 3, wherein the X channel measurement resource groups are divided according to at least one of the following manners:

a plurality of channel measurement resources corresponding to the same port being divided into one group;

a plurality of channel measurement resources corresponding to the same sequence being divided into one group;

a plurality of channel measurement resources comprised in the same time domain resource unit being divided into one group;

a plurality of channel measurement resources comprised in the same frequency domain resource unit being divided into one group;

a plurality of channel measurement resources comprised in the same resource block RB being divided into one group;

determining the X channel measurement resource groups according to configuration signaling of a transmitting end.

5. The method according to claim 1, wherein the resource selection constraint is determined by one of the following manners:

determining according to configuration instruction signaling of the transmitting end;

determining according to channel measurement resource configuration parameters transmitted by the transmitting end.

6. The method according to claim 1, wherein the method further comprises:

receiving a weighted combined parameter or a phase difference indication parameter of N1 channel measurement resources in the N channel measurement resources transmitted by the transmitting end, where N1 is less than or equal to N.

7. The method according to claim 1, wherein the M channel measurement resources comprise at least one of the following resources:

a port resource;

a beam resource;

a sequence resource;

a time domain resource;

a frequency domain resource.

8. The method according to claim 1, wherein the resource selection constraint comprises one of:

the N channel measurement resources at least comprising $N_a$ channel measurement resources belonging to different time domain resource units, where $N_a$ is an integer that is greater than or equal to 2 and less than or equal to N, and the time domain resource unit comprising at least one of: a symbol, a symbol group, a time slot, a time slot group, a subframe, a subframe group, a transmission time interval TTI, a transmission time interval TTI group;

the N channel measurement resources at least comprising $N_b$ channel measurement resources corresponding to different ports, where $N_b$ is an integer that is greater than or equal to 2 and less than or equal to N;

the N channel measurement resources at least comprising $N_c$ channel measurement resources corresponding to different sequences, where $N_c$ is an integer that is greater than or equal to 2 and less than or equal to N;

the N channel measurement resources at least comprising $N_d$ channel measurement resources corresponding to different resource blocks RB, where $N_d$ is an integer that is greater than or equal to 2 and less than or equal to N.

9. The method according to claim 1, wherein the resource selection constraint comprises one of:

when the same time domain resource unit comprises $M_a$ channel measurement resources of the M channel measurement resources, the N channel measurement resources at most comprising $n_a$ channel measurement resources of the $M_a$ channel measurement resources, where $n_a$ is less than N;

when the same port corresponds to $M_b$ channel measurement resources of the M channel measurement resources, the N channel measurement resources at most comprising $n_b$ channel measurement resources of the $M_b$ channel measurement resources, where $n_b$ is less than N;

when the same sequence corresponds to $M_c$ channel measurement resources of the M channel measurement resources, the N channel measurement resources at most comprising $n_c$ channel measurement resources of the $M_c$ channel measurement resources, where $n_c$ is less than N;

when the same RB comprises $M_d$ channel measurement resources of the M channel measurement resources, the N channel measurement resources at most comprising $n_d$ channel measurement resources of the $M_d$ channel measurement resources, where $n_d$ is less than N.

10. The method according to claim 1, wherein the resource selection constraint comprises one of:
   a relationship of the channel measurement resource indices corresponding to any two channel measurement resources of the N channel measurement resources satisfies an index relationship constraint rule, the index relationship constraint rule being configured by a transmitting end;
   an interval of locations of the time-frequency resources of the channel measurement resources corresponding to any two of the N channel measurement resources satisfies the time-frequency resource location interval constraint rule, the time-frequency resource location interval constraint rule being configured by a transmitting end.

11. The method according to claim 5, wherein the channel measurement resource configuration parameters comprises at least one of:
   the number M of the M channel measurement resources;
   a configuration parameter for the subset comprised in the set of channel measurement resources;
   resource location configuration parameters of the M channel measurement resources.

12. A non-transitory computer-readable storage medium comprising a stored program, wherein the method according to claim 1 is carried out when the program is executed.

13. A device for feeding back channel information comprises:
   a first determining module, configured for determining a set of channel measurement resources, the set of channel measurement resources comprising M channel measurement resources, where M is a positive integer;
   a first measuring module, configured for performing channel measurement on the M channel measurement resources;
   a first selecting module, configured for selecting the N channel measurement resources from the M channel measurement resources according to a channel measurement result, where N is a positive integer, and N≤M;
   a first feeding back module, configured for feeding back indication information of the selected N channel measurement resources,
   wherein the first selecting module comprises:
   a first selecting unit, configured for selecting the N channel measurement resources from the M channel measurement resources according to the result of the channel measurement and the resource selection constraint.

14. The device according to claim 13, wherein the device further comprises:
   a grouping module, configured for grouping the M channel measurement resources or the N channel measurement resources, and determining quality information of the channel measurement resources required to be fed back according to a manner of grouping.

* * * * *